US010963095B1

(12) United States Patent
Dedhia et al.

(10) Patent No.: US 10,963,095 B1
(45) Date of Patent: Mar. 30, 2021

(54) GLOVE TOUCH DETECTION

(71) Applicant: Apple Inc., Cupertino, CA (US)

(72) Inventors: Siddharth Dedhia, Los Altos, CA (US); Xiaoqi Zhou, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/778,796

(22) Filed: Jan. 31, 2020

Related U.S. Application Data

(60) Provisional application No. 62/907,046, filed on Sep. 27, 2019.

(51) Int. Cl.
*G06F 3/045* (2006.01)
*G06F 3/041* (2006.01)
*G06F 3/044* (2006.01)

(52) U.S. Cl.
CPC ........ *G06F 3/04166* (2019.05); *G06F 3/0446* (2019.05); *G06F 2203/04108* (2013.01)

(58) Field of Classification Search
CPC ............... G06F 3/04166; G06F 3/0446; G06F 2203/04108
See application file for complete search history.

(56) References Cited

U.S. PATENT DOCUMENTS

| 5,483,261 A | 1/1996 | Yasutake |
| 5,488,204 A | 1/1996 | Mead et al. |
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,310,610 B1 | 10/2001 | Beaton et al. |

(Continued)

FOREIGN PATENT DOCUMENTS

| CN | 101751179 A | 6/2010 |
| CN | 102541379 A | 7/2012 |

(Continued)

OTHER PUBLICATIONS

"CapTouch Programmable Controller for Single-Electrode Capacitance Sensors", Analog Devices, AD7147 Data Shed (Rev. E), Available online at: <www.cecb2b.com>, 2007, pp. 1, 2 & 25.

(Continued)

*Primary Examiner* — Joe H Cheng
(74) *Attorney, Agent, or Firm* — Kubota & Basol LLP

(57) ABSTRACT

An electronic device including a touch screen or touch sensor panel can operate in a bare finger touch detection mode or a glove touch detection mode. While operating in the bare finger touch detection mode, in response to detecting a signal density slope corresponding to a gloved object touching the panel and lifting off without re-approaching the panel within a predetermined time or in response to detecting a signal density slope corresponding to a gloved object touching the panel continuously for a predetermined period of time, the electronic device can transition from the bare finger mode to the glove touch mode, for example. While in the glove touch detection mode, the electronic device can transition to the bare finger touch detection mode in response to detecting a touch signal density that exceeds a predetermined threshold or in response to detecting a touch signal that exceeds a predetermined threshold.

20 Claims, 11 Drawing Sheets

(56) References Cited

U.S. PATENT DOCUMENTS

| | | | |
|---|---|---|---|
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,567,240 B2 | 7/2009 | Peterson, Jr. et al. | |
| 7,663,607 B2 | 2/2010 | Hotelling et al. | |
| 8,479,122 B2 | 7/2013 | Hotelling et al. | |
| 8,614,693 B2 | 12/2013 | King et al. | |
| 8,736,432 B2 | 5/2014 | Sitarski | |
| 9,046,977 B2 * | 6/2015 | Mahalingam | G06F 3/0446 |
| 9,122,332 B2 | 9/2015 | Li et al. | |
| 9,134,832 B2 | 9/2015 | Baard et al. | |
| 9,229,573 B2 | 1/2016 | Igarashi et al. | |
| 9,250,790 B2 | 2/2016 | Sakurai | |
| 9,430,111 B2 | 8/2016 | Citta | |
| 9,690,417 B2 * | 6/2017 | Benbasat | G06F 3/0412 |
| 9,778,742 B2 | 10/2017 | Tate et al. | |
| 9,946,425 B2 * | 4/2018 | Jordan | G06F 3/0446 |
| 10,444,820 B2 * | 10/2019 | Liu | G06F 1/3206 |
| 10,592,027 B2 * | 3/2020 | Zhang | G06F 3/0418 |
| 10,620,758 B2 * | 4/2020 | Benbasat | G06F 3/0416 |
| 2006/0197753 A1 | 9/2006 | Hotelling | |
| 2008/0158145 A1 | 7/2008 | Westerman | |
| 2008/0158146 A1 | 7/2008 | Westerman | |
| 2008/0158147 A1 | 7/2008 | Westerman et al. | |
| 2008/0158185 A1 | 7/2008 | Westerman | |
| 2012/0162105 A1 * | 6/2012 | Sakurai | G06F 3/0488 345/173 |
| 2013/0154965 A1 | 6/2013 | Hwang et al. | |
| 2013/0207913 A1 * | 8/2013 | Takashima | G06F 3/04883 345/173 |
| 2013/0265276 A1 * | 10/2013 | Obeidat | G06F 3/04162 345/174 |
| 2013/0328616 A1 | 12/2013 | Buttolo et al. | |
| 2013/0328828 A1 | 12/2013 | Tate | |
| 2014/0002340 A1 | 1/2014 | Jordan et al. | |
| 2014/0043251 A1 | 2/2014 | Wilson et al. | |
| 2014/0184551 A1 | 7/2014 | Igarashi et al. | |
| 2015/0130478 A1 | 5/2015 | Erkens et al. | |
| 2015/0338983 A1 | 11/2015 | Benbasat et al. | |
| 2017/0262101 A1 | 9/2017 | Benbasat et al. | |
| 2018/0284902 A1 * | 10/2018 | Yamaguchi | G06F 3/017 |

FOREIGN PATENT DOCUMENTS

| | | | |
|---|---|---|---|
| DE | 102011054415 A1 | 4/2013 | |
| EP | 0618528 A1 | 10/1994 | |
| JP | 2000-163031 A | 6/2000 | |
| JP | 2002-342033 A | 11/2002 | |
| JP | 2013-254331 A | 12/2013 | |
| JP | 2013254331 A * | 12/2013 | G06F 3/041 |
| WO | 2008/085403 A2 | 7/2008 | |
| WO | 2013/113340 A1 | 8/2013 | |
| WO | 2013/188173 A1 | 12/2013 | |

OTHER PUBLICATIONS

First Action Interview Office Action received for U.S. Appl. No. 14/284,357, dated Nov. 7, 2016, 6 pages.

Lee et al. "A Multi-Touch Three Dimensional Touch-Sensitive Tablet", CHI'85 Proceedings, Apr. 1985, pp. 21-25.

Non-Final Office Action received for U.S. Appl. No. 15/608,813, dated May 1, 2019, 11 pages.

Notice of Allowance received for U.S. Appl. No. 14/284,357, dated Mar. 21, 2017, 5 pages.

Notice of Allowance received for U.S. Appl. No. 15/608,813, dated Jan. 10, 2020, 8 pages.

Preinterview First Office Action received for U.S. Appl. No. 14/284,357, dated May 13, 2016, 4 pages.

Restriction Requirement received for U.S. Appl. No. 14/284,357, dated Apr. 13, 2016, 6 pages.

Rubine, Dean H., "Combining Gestures and Direct Manipulation", CHI'92, May 1992, pp. 659-660.

Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.

Search Report received for Chinese Patent Application No. 201510259683.7, dated Jul. 13, 2017, 4 pages (2 pages of English Translation and 2 pages of Official copy).

Search Report received for United Kingdom Patent Application No. GB1507972.6, dated Oct. 29, 2015, 1 page.

Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.

* cited by examiner

GLOVE TOUCH DETECTION

CROSS-REFERENCE TO RELATED APPLICATION

This application claims the benefit of U.S. Provisional Application No. 62/907,046, filed Sep. 27, 2019, which is hereby incorporated by reference in its entirety for all purposes.

FIELD OF THE DISCLOSURE

This relates generally to a touch sensor panel or touch screen and, more specifically, to an electronic device that transitions between touch detection modes based on one or more criteria related to the detected touch data.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of transparent, semi-transparent or non-transparent conductive plates made of materials such as Indium Tin Oxide (ITO). In some examples, the conductive plates can be formed from other materials including conductive polymers, metal mesh, graphene, nanowires (e.g., silver nanowires) or nanotubes (e.g., carbon nanotubes). In some implementations, due in part to their substantial transparency, some capacitive touch sensor panels can be overlaid on a display to form a touch screen, as described above. Some touch screens can be formed by at least partially integrating touch sensing circuitry into a display pixel stackup (i.e., the stacked material layers forming the display pixels).

In some examples, an electronic device compares sensed touch data to a touch threshold to determine whether or not a proximate object touches the touch screen. In some situations, users interact with touch screens with a barrier between their fingers and the touch screen. For example, a user may be wearing gloves while operating an electronic device with a touch screen. The electronic device may not be able to detect a gloved finger touching the touch screen because the touch signal generated in response to the touching gloved finger may not reach the tuned touch detection threshold of the electronic device.

BRIEF SUMMARY OF THE DISCLOSURE

This relates generally to a touch sensor panel or touch screen and, more specifically, to an electronic device that transitions between touch detection modes based on one or more criteria related to the detected touch data. In some examples, the electronic device is able to detect touch in a bare finger touch mode with an associated bare finger touch detection threshold or in a glove touch mode with an associated glove touch detection threshold that is lower than the bare finger touch detection threshold. Detecting touch can include sensing touch signals of an input patch corresponding to a proximate object (e.g., a conductive object such as a finger or stylus), for example. In some examples, the electronic device can calculate the slope of the signal density over time. While operating in the bare finger touch detection mode, in response to detecting a touch signal density slope that satisfies a plurality of predetermined criteria, the electronic device can transition from the bare finger touch detection mode to the glove touch detection mode.

In some examples, the predetermined criteria are satisfied in response to detecting a slope of a signal density that corresponds to a gloved finger touching the panel and lifting off from the panel without re-approaching the panel within a predetermined period of time. In some examples, the predetermined criteria are satisfied in response to detecting a slope of a signal density that corresponds to a gloved finger continuously touching the panel for a predetermined period of time. The electronic device can evaluate the predetermined criteria by comparing the slope of the signal density to one or more predetermined thresholds according to a finite state machine, for example. While in the glove touch detection mode, the electronic device can transition to the bare finger touch detection mode in response to detecting a touch signal density that exceeds a bare finger touch threshold or in response to detecting a touch signal that exceeds a predetermined threshold.

DETAILED DESCRIPTION OF THE DISCLOSURE

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates generally to a touch sensor panel or touch screen and, more specifically, to an electronic device that transitions between touch detection modes based on one or more criteria related to the detected touch data. In some examples, the electronic device is able to detect touch in a bare finger touch mode with an associated bare finger touch detection threshold or in a glove touch mode with an associated glove touch detection threshold that is lower than the bare finger touch detection threshold. Detecting touch can include sensing touch signals of an input patch corresponding to a proximate object (e.g., a conductive object such as a finger or stylus), for example. In some examples, the electronic device can calculate the slope of the signal density over time. While operating in the bare finger touch detection mode, in response to detecting a touch signal density slope that satisfies a plurality of predetermined criteria, the electronic device can transition from the bare finger touch detection mode to the glove touch detection mode.

In some examples, the predetermined criteria are satisfied in response to detecting a slope of a signal density that corresponds to a gloved finger touching the panel and lifting off from the panel without re-approaching the panel within a predetermined period of time. In some examples, the predetermined criteria are satisfied in response to detecting a slope of a signal density that corresponds to a gloved finger continuously touching the panel for a predetermined period of time. The electronic device can evaluate the predetermined criteria by comparing the slope of the signal density to one or more predetermined thresholds according to a finite state machine, for example. While in the glove touch detection mode, the electronic device can transition to the bare finger touch detection mode in response to detecting a touch signal density that exceeds a bare finger touch threshold or in response to detecting a touch signal that exceeds a predetermined threshold.

Figure 1A:
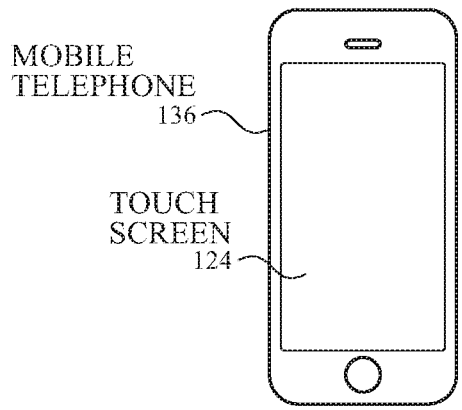
FIGS. 1A-1F illustrate example systems that can use glove touch detection techniques according to examples of the disclosure.
Figure 1B:
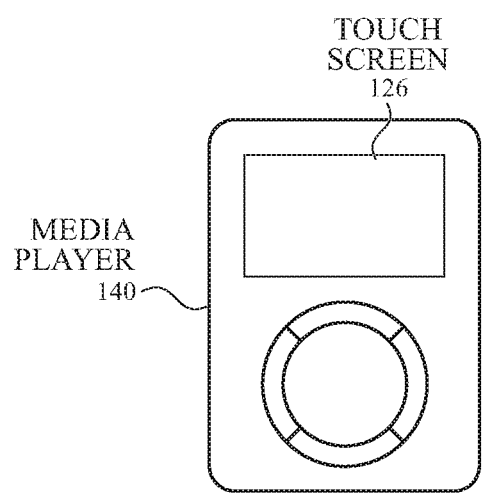
Figure 1C:
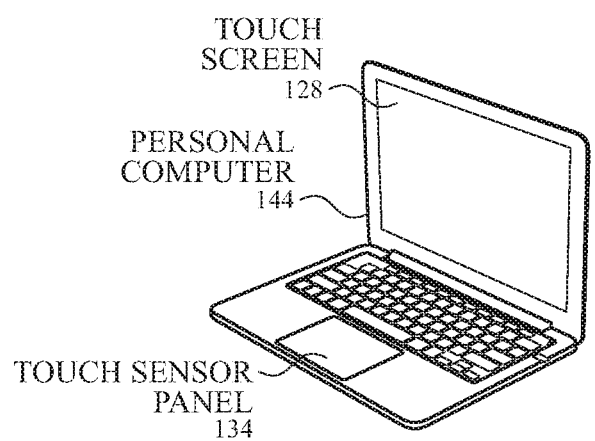
Figure 1D:
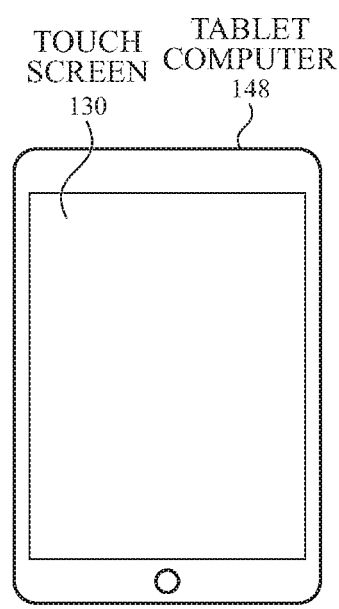
Figure 1E:
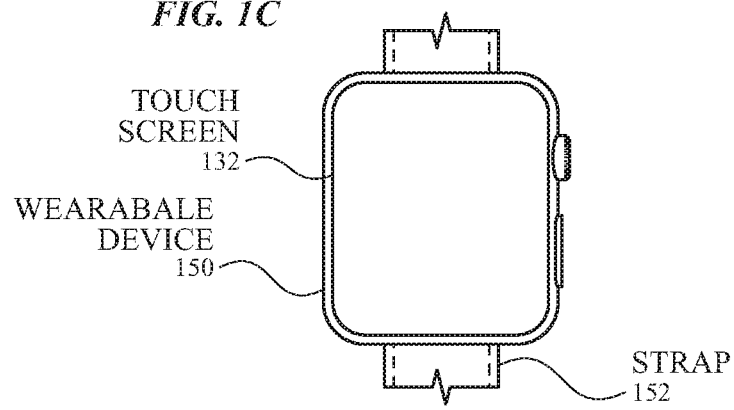
Figure 1F:
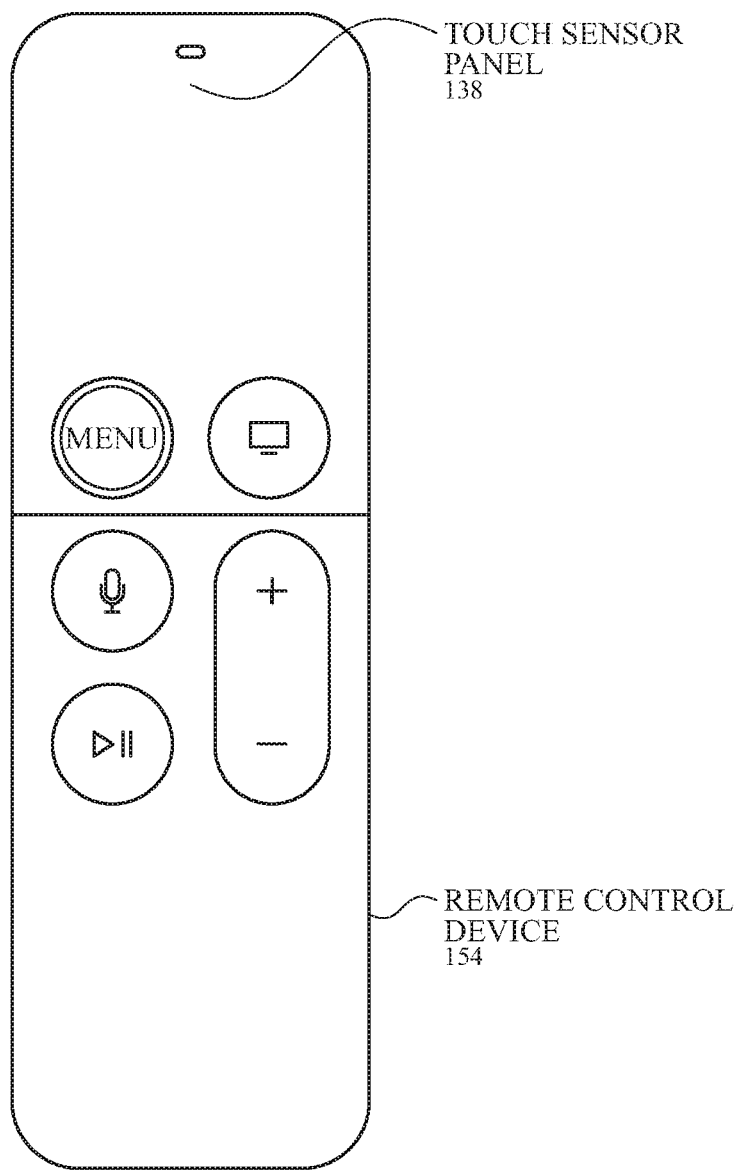

FIGS. 1A-1F illustrate example systems that can use glove touch detection techniques according to examples of the disclosure. FIG. 1A illustrates an example mobile telephone 136 that includes a touch screen 124 that can use glove touch detection techniques according to examples of the disclosure. FIG. 1B illustrates an example digital media player 140 that includes a touch screen 126 that can use glove touch detection techniques according to examples of the disclosure. FIG. 1C illustrates an example personal computer 144 that includes a touch screen 128 and a touch sensor panel 134 (e.g., a trackpad) that can use glove touch detection techniques according to examples of the disclosure. FIG. 1D illustrates an example tablet computing device 148 that includes a touch screen 130 that can use glove touch detection techniques according to examples of the disclosure. FIG. 1E illustrates an example wearable device 150 that includes a touch screen 132 and can be attached to a user using a strap 152 and that can use glove touch detection techniques according to examples of the disclosure. FIG. 1F illustrates an example remote control device 154 that includes a touch sensor panel 138 that can use glove touch detecting techniques according to examples of the disclosure. It is understood that a touch screen and glove touch detection techniques can be implemented in other devices, including future devices not yet in the marketplace. Additionally it should be understood that although the disclosure herein primarily focuses on touch screens, the disclosure of glove touch detection techniques can be implemented for devices including touch sensor panels (and displays) that may not be implemented as a touch screen.

In some examples, touch screens 124, 126, 128, 130 and 132 and touch sensor panels 134 and 138 can be based on self-capacitance. A self-capacitance based touch system can include a matrix of small, individual plates of conductive material or groups of individual plates of conductive material forming larger conductive regions that can be referred to as touch electrodes or as touch node electrodes (as described below with reference to FIG. 4B). For example, a touch screen can include a plurality of individual touch electrodes, each touch electrode identifying or representing a unique location (e.g., a touch node) on the touch screen at which touch or proximity is to be sensed, and each touch node electrode being electrically isolated from the other touch node electrodes in the touch screen/panel. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an alternating current (AC) waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen. In some examples, the touch node electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126, 128, 130 and 132 and touch sensor panels 134 and 138 can be based on mutual capacitance. A mutual capacitance based touch system can include electrodes arranged as drive and sense lines (e.g., as described below with reference to FIG. 4A) that may cross over each other on different layers (in a double-sided configuration), or may be adjacent to each other on the same layer. The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen. As described herein, in some examples, a mutual capacitance based touch system can form touch nodes from a matrix of small, individual plates of conductive material.

In some examples, touch screens 124, 126, 128, 130 and 132 and touch sensor panels 134 and 138 can be based on mutual capacitance and/or self-capacitance. The electrodes can be arrange as a matrix of small, individual plates of conductive material (e.g., as in touch node electrodes 408 in touch screen 402 in FIG. 4B) or as drive lines and sense lines (e.g., as in row touch electrodes 404 and column touch electrodes 406 in touch screen 400 in FIG. 4A), or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

Figure 2:
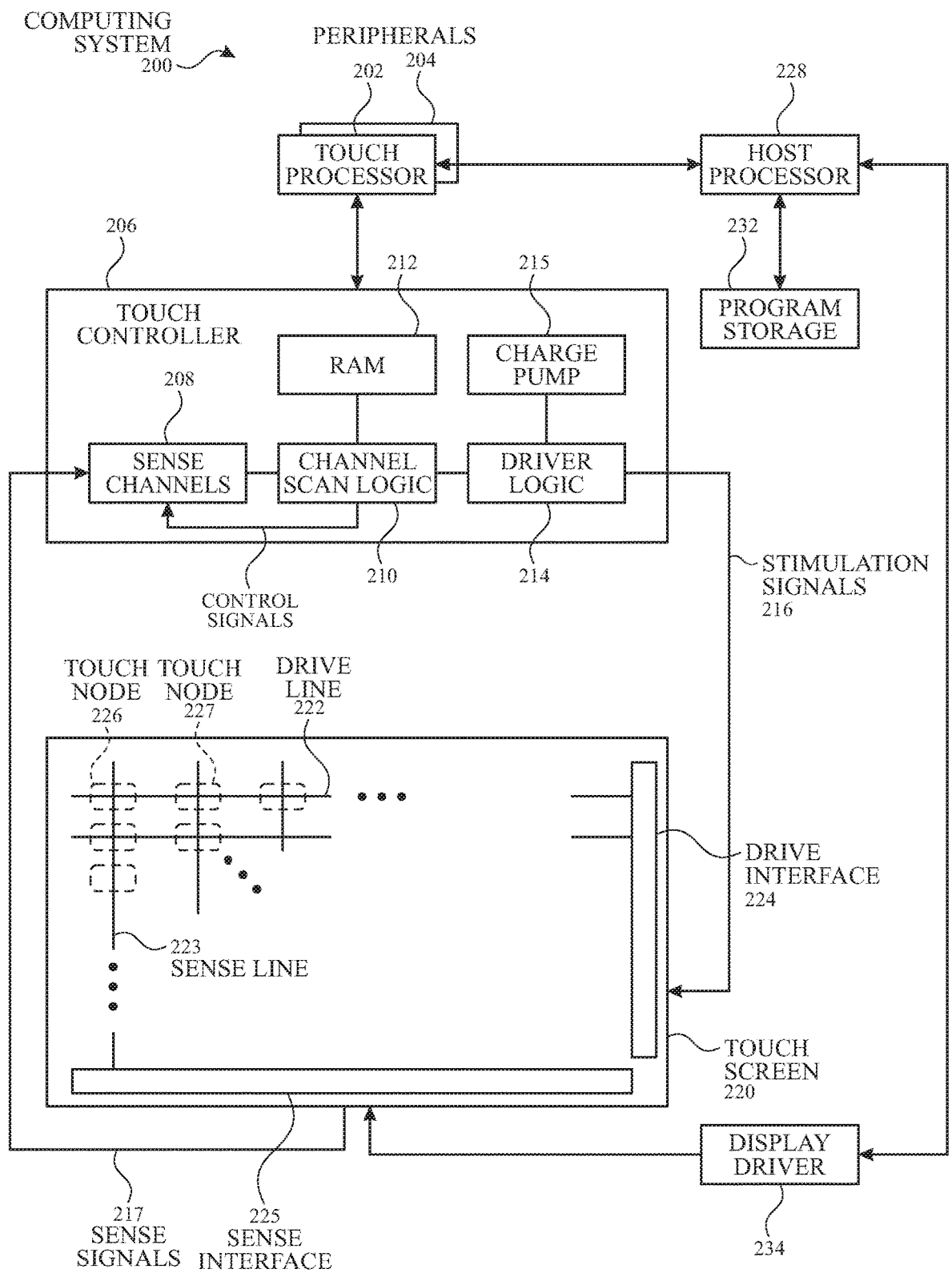
FIG. 2 illustrates an example computing system including a touch screen that can use glove touch detection techniques according to examples of the disclosure.

FIG. 2 illustrates an example computing system including a touch screen that can use glove touch detection techniques according to examples of the disclosure. Computing system 200 can be included in, for example, a mobile phone, tablet, touchpad, portable or desktop computer, portable media player, wearable device or any mobile or non-mobile computing device that includes a touch screen or touch sensor panel. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers, co-processor(s) and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and/or phases that can be selectively applied to drive regions of the touch sensing circuitry of touch screen 220, as described in more detail below. In some examples, touch controller 206, touch processor 202 and peripherals 204 can be integrated into a single application specific integrated circuit (ASIC), and in some examples can be integrated with touch screen 220 itself.

It should be apparent that the architecture shown in FIG. 2 is only one example architecture of computing system 200, and that the system could have more or fewer components than shown, or a different configuration of components. The various components shown in FIG. 2 can be implemented in hardware, software, firmware or any combination thereof, including one or more signal processing and/or application specific integrated circuits.

Computing system 200 can include a host processor 228 for receiving outputs from touch processor 202 and performing actions based on the outputs. For example, host processor 228 can be connected to program storage 232 and a display controller/driver 234 (e.g., a Liquid-Crystal Display (LCD) driver). It is understood that although some examples of the disclosure may described with reference to LCD displays, the scope of the disclosure is not so limited and can extend to other types of displays, such as Light-Emitting Diode (LED) displays, including Organic LED (OLED), Active-Matrix Organic LED (AMOLED) and Passive-Matrix Organic LED (PMOLED) displays. Display driver 234 can provide voltages on select (e.g., gate) lines to each pixel transistor and can provide data signals along data lines to these same transistors to control the pixel display image.

Host processor 228 can use display driver 234 to generate a display image on touch screen 220, such as a display image of a user interface (UI), and can use touch processor 202 and touch controller 206 to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, capturing an image with a camera in communication with the electronic device, exiting an idle/sleep state of the electronic device, and/or the like. Host processor 228 can also perform additional functions that may not be related to touch processing.

Note that one or more of the functions described herein, including the configuration of switches, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. In some examples, RAM 212 or program storage 232 (or both) can be a non-transitory computer readable storage medium. One or both of RAM 212 and program storage 232 can have stored therein instructions, which when executed by touch processor 202 or host processor 228 or both, can cause the device including computing system 200 to perform one or more functions and methods of one or more examples of this disclosure. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Touch screen 220 can be used to derive touch information at multiple discrete locations of the touch screen, referred to herein as touch nodes. Touch screen 220 can include touch sensing circuitry that can include a capacitive sensing medium having a plurality of drive lines 222 and a plurality of sense lines 223. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224, and resulting sense signals 217 generated in sense lines 223 can be transmitted through a sense interface 225 to sense channels 208 in touch controller 206. In this way, drive lines and sense lines can be part of the touch sensing circuitry that can interact to form capacitive sensing nodes, which can be thought of as touch picture elements (touch pixels) and referred to herein as touch nodes, such as touch nodes 226 and 227. This way of understanding can be particularly useful when touch screen 220 is viewed as capturing an "image" of touch ("touch image"). In other words, after touch controller 206 has determined whether a touch has been detected at each touch nodes in the touch screen, the pattern of touch nodes in the touch screen at which a touch occurred can be thought of as an "image" of touch (e.g., a pattern of fingers touching the touch screen). As used herein, an electrical component "coupled to" or "connected to" another electrical component encompasses a direct or indirect connection providing electrical path for communication or operation between the coupled components. Thus, for example, drive lines 222 may be directly connected to driver logic 214 or indirectly connected to driver logic 214 via drive interface 224 and sense lines 223 may be directly connected to sense channels 208 or indirectly connected to sense channels 208 via sense interface 225. In either case an electrical path for driving and/or sensing the touch nodes can be provided.

Figure 3A:
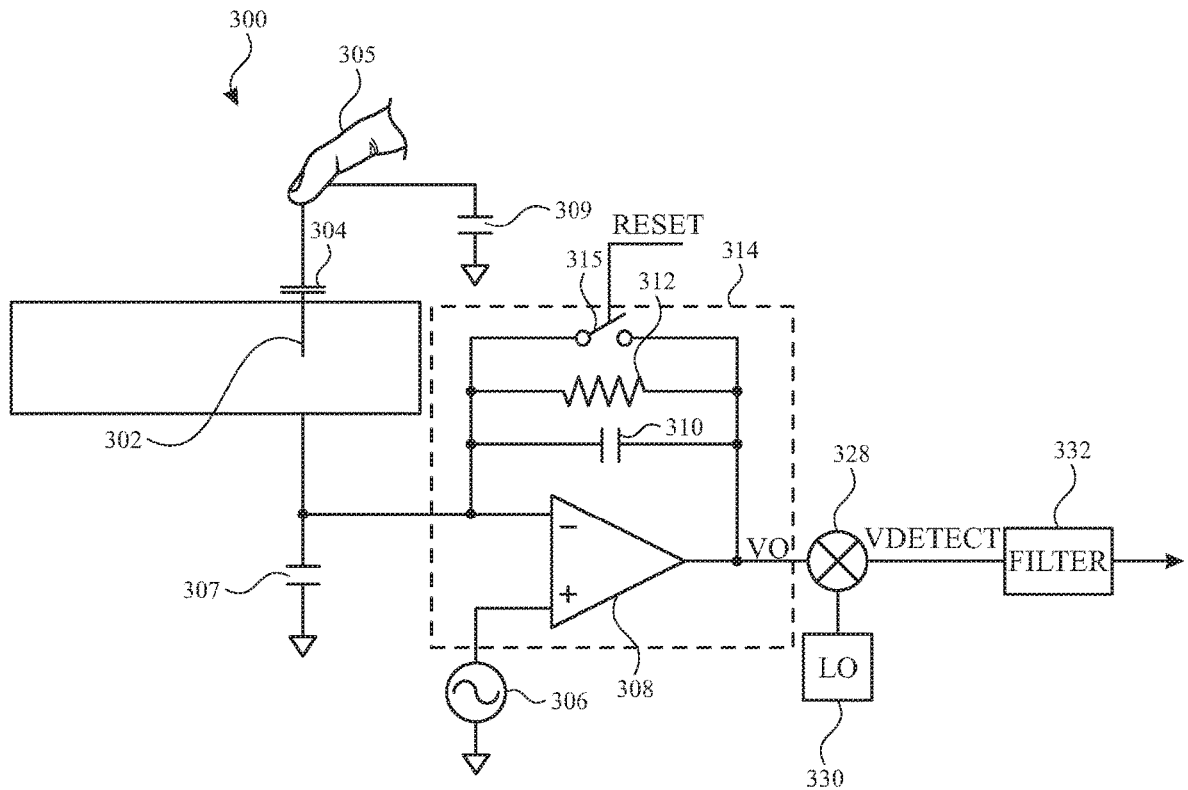
FIG. 3A illustrates an exemplary touch sensor circuit corresponding to a self-capacitance measurement of a touch node electrode and sensing circuit according to examples of the disclosure.

FIG. 3A illustrates an exemplary touch sensor circuit 300 corresponding to a self-capacitance measurement of a touch node electrode 302 and sensing circuit 314 (e.g., corresponding to a sense channel 208) according to examples of the disclosure. Touch node electrode 302 can correspond to a touch electrode 404 or 406 of touch screen 400 or a touch node electrode 408 of touch screen 402. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be illustrated as capacitance 304. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC voltage source 306 ($V_{ac}$) can be coupled to the non-inverting input (+) of operational amplifier 308. Touch sensor circuit 300 can be configured to sense changes (e.g., increases) in the total self-capacitance 304 of the touch node electrode 302 induced by a finger or object either touching or in proximity to the touch sensor panel. Output 320 can be used by a processor to determine the presence of a proximity or touch event, or the output can be inputted into a discrete logic network to determine the presence of a proximity or touch event.

Figure 3B:
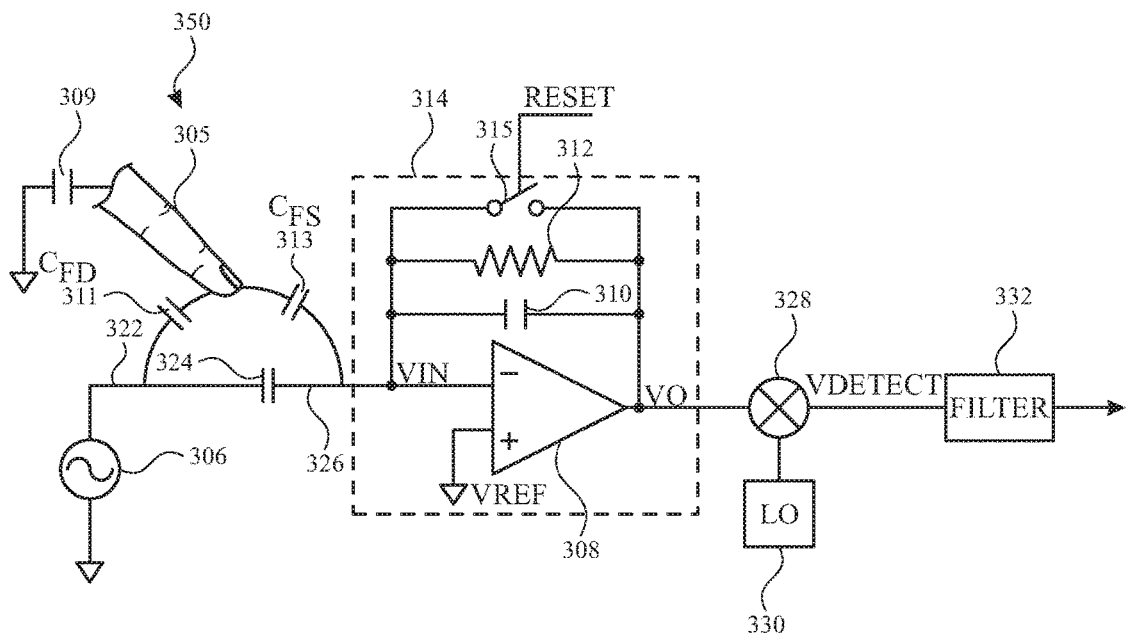
FIG. 3B illustrates an exemplary touch sensor circuit corresponding to a mutual-capacitance drive line and sense line and sensing circuit according to examples of the disclosure.

FIG. 3B illustrates an exemplary touch sensor circuit 350 corresponding to a mutual-capacitance drive line 322 and sense line 326 and sensing circuit 314 (e.g., corresponding to a sense channel 208) according to examples of the disclosure. Drive line 322 can be stimulated by stimulation signal 306 (e.g., an AC voltage signal). Stimulation signal 306 can be capacitively coupled to sense line 326 through mutual capacitance 324 between drive line 322 and the sense line. When a finger or object 305 approaches the touch node created by the intersection of drive line 322 and sense line 326, mutual capacitance 324 can change (e.g., decrease). This change in mutual capacitance 324 can be detected to indicate a touch or proximity event at the touch node, as described herein. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as $V_{in}$) can be inputted into the inverting input of operational amplifier 308, and the non-inverting input of the operational amplifier can be coupled to a reference voltage $V_{ref}$. Operational amplifier 308 can drive its output to voltage $V_o$ to keep yin substantially equal to $V_{ref}$ and can therefore maintain $V_{in}$ constant or virtually grounded. A person of skill in the art would understand that in this context, equal can include deviations of up to 15%. Therefore, the gain of sensing circuit 314 can be mostly a function of the ratio of mutual capacitance 324 and the feedback impedance, comprised of resistor 312 and/or capacitor 310. The output of sensing circuit 314 Vo can be filtered and heterodyned or homodyned by being fed into multiplier 328, where Vo can be multiplied with local oscillator 330 to produce $V_{detect}$. $V_{detect}$ can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of $V_{detect}$ can be used to determine if a touch or proximity event has occurred.

Referring back to FIG. 2, in some examples, touch screen 220 can be an integrated touch screen in which touch sensing circuit elements of the touch sensing system can be integrated into the display pixel stack-ups of a display. The circuit elements in touch screen 220 can include, for example, elements that can exist in LCD or other displays (LED display, OLED display, etc.), such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 4B:
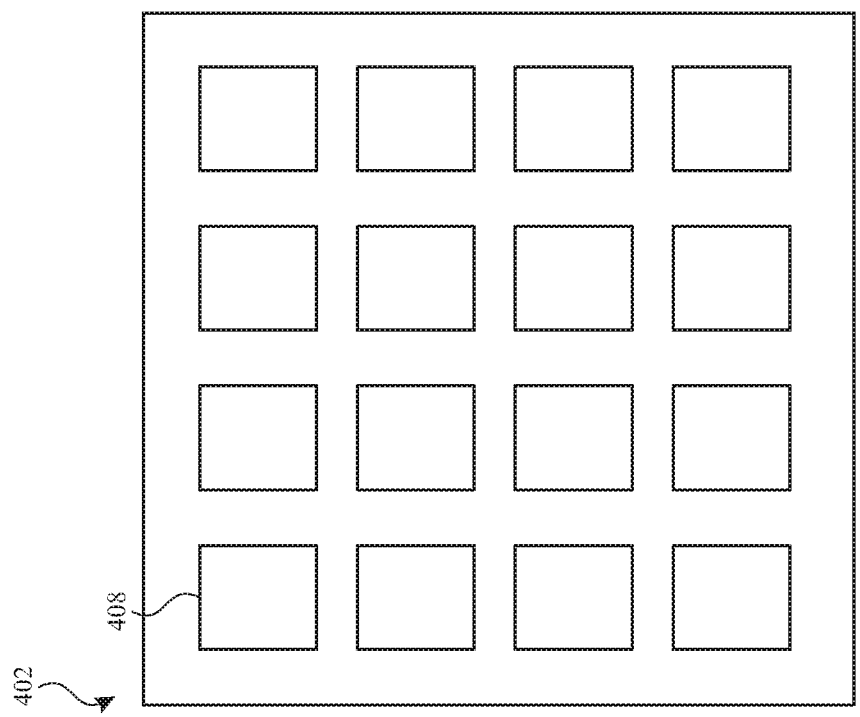
FIG. 4B illustrates touch screen with touch node electrodes arranged in a pixelated touch node electrode configuration according to examples of the disclosure.
Figure 4A:
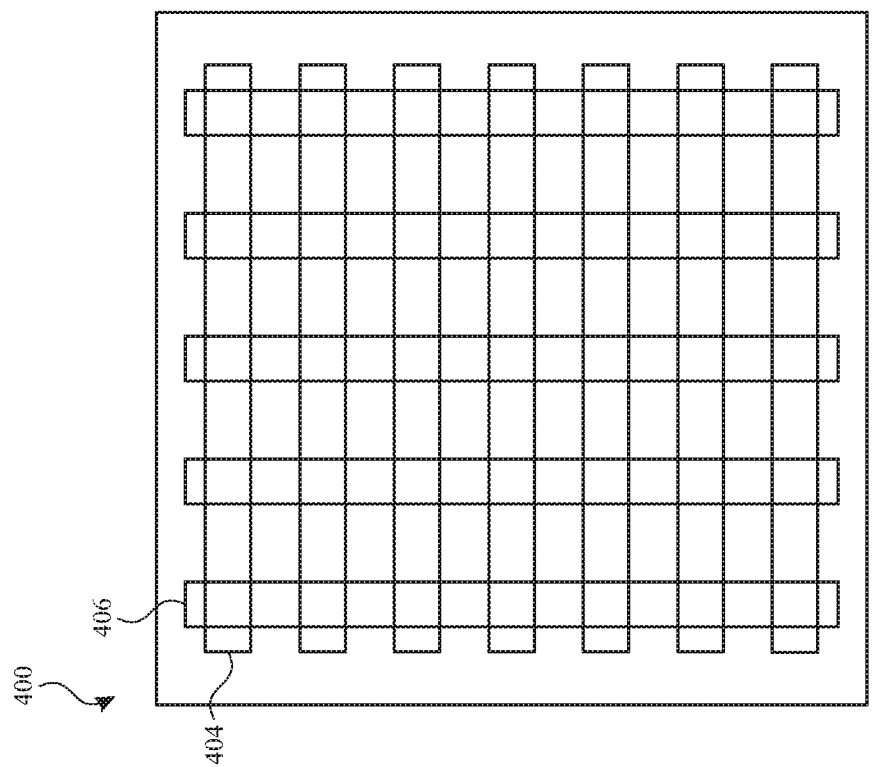
FIG. 4A illustrates touch screen with touch electrodes arranged in rows and columns according to examples of the disclosure.

FIG. 4A illustrates touch screen 400 with touch electrodes 404 and 406 arranged in rows and columns according to examples of the disclosure. Specifically, touch screen 400 can include a plurality of touch electrodes 404 disposed as rows, and a plurality of touch electrodes 406 disposed as columns. Touch electrodes 404 and touch electrodes 406 can be on the same or different material layers on touch screen 400, and can intersect with each other, as illustrated in FIG. 4A. In some examples, the electrodes can be formed on opposite sides of a transparent (partially or fully) substrate and from a transparent (partially or fully) semiconductor material, such as ITO, though other materials are possible. Electrodes displayed on layers on different sides of the substrate can be referred to herein as a double-sided sensor. In some examples, touch screen 400 can sense the self-capacitance of touch electrodes 404 and 406 to detect touch and/or proximity activity on touch screen 400, and in some examples, touch screen 400 can sense the mutual capacitance between touch electrodes 404 and 406 to detect touch and/or proximity activity on touch screen 400. Although the touch electrodes 404 and 406 are illustrated as being rectangularly-shaped, it should be understood that other electrode shapes and structures (e.g., diamond-, square-, stripe- or circle-shaped electrodes connected by jumpers or vias) are possible.

FIG. 4B illustrates touch screen 402 with touch node electrodes 408 arranged in a pixelated touch node electrode configuration according to examples of the disclosure. Specifically, touch screen 402 can include a plurality of individual touch node electrodes 408, each touch node electrode identifying or representing a unique location on the touch screen at which touch or proximity (i.e., a touch or proximity event) is to be sensed, and each touch node electrode being electrically isolated from the other touch node electrodes in the touch screen/panel, as previously described. Touch node electrodes 408 can be on the same or different material layers on touch screen 402. In some examples, touch screen 402 can sense the self-capacitance of touch node electrodes 408 to detect touch and/or proximity activity on touch screen 402, and in some examples, touch screen 402 can sense the mutual capacitance between touch node electrodes 408 to detect touch and/or proximity activity on touch screen 402. Although touch node electrodes 408 are illustrated as having rectangular shapes, it should be understood that other electrode shapes (e.g., diamonds, circles, stripes etc.) and structures are possible.

Figure 5A:
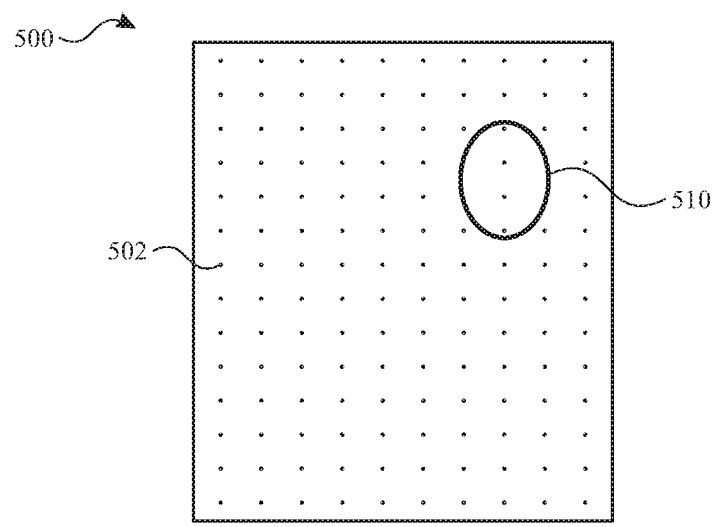
FIG. 5A illustrates an exemplary image of touch according to examples of the disclosure.

As discussed above, signals generated at the touch nodes of touch screen 124, 220, 400, or 402 can be viewed as an image of the touch. FIG. 5A illustrates an exemplary image of touch according to examples of the disclosure. Touch screen 500 can include a plurality of touch nodes 502. As described above, with reference to FIGS. 1-4, each touch node 502 can be the intersection of touch electrodes 404 and 406 arranged as row electrodes and column electrodes that function as drive electrodes and sense electrodes, such as in touch screen 400 illustrated in FIG. 4A. In some examples, as described above with reference to FIGS. 1-4, each touch node 502 can be at a location of a touch node electrode 408, such as in touch screen 402 described above with reference to FIG. 4B. In some examples, an image of touch can be generated by a touch screen 500 in response to detecting a proximate conductive object (e.g., a finger, a stylus, etc.).

Each object touching or hovering over the touch screen 500 (i.e., proximate to the touch screen) can be represented by an input patch 510 in the touch image that includes touch nodes with a touch signal above a threshold in an area corresponding to the location at which the object is in contact with or proximity to the touch screen and, in some examples, that includes one or more additional touch nodes proximate to the location at which the object is in contact with or proximity to the touch screen. For example, one or more touch nodes 502 of the input patch 510 located at locations overlapping a location of the touch or proximity of an object can produce signals with one or more first magnitudes and one or more touch nodes of the input patch 510 at locations adjacent to or otherwise proximate to the location of the touch or proximity of an object can produce signals with one or more second magnitudes that are less than the first magnitude. Thus, signals from proximate touch nodes 502 can be grouped together to form input patches 510. Thus, the input patch 510 can be a region within the image of touch corresponding to touch nodes 502 having signal values produced by an object touching or hovering over the touch screen 500 (e.g., those with signal greater than a threshold).

Figure 5B:
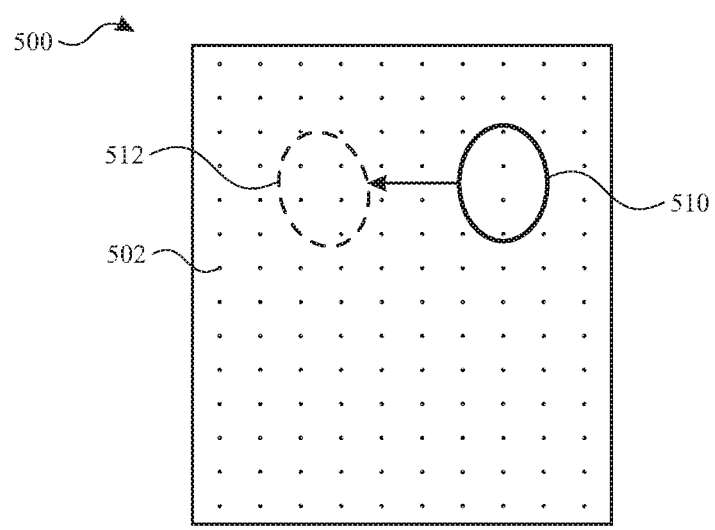
FIG. 5B illustrates an exemplary representation indicative of an object that moves along the surface of the touch screen according to some examples of the disclosure.

In some situations, a proximate object can change the location at which the proximate object is in contact with (or proximate to) the touch screen 500. For example, a user may perform a gesture at (or over) the touch screen, such as a swipe or other movement, or the user's hand may move involuntarily. FIG. 5B illustrates an exemplary representation indicative of an object that moves along the surface of the touch screen according to some examples of the disclosure. As shown in FIG. 5B, input patch 510 can initially be detected in a first touch image (e.g., when the user initially touches the touch screen) and input patch 512 can be detected at a time after input patch 510 was detected in a second, subsequent touch image. Although not shown in FIG. 5B, an input patch can be detected during additional touch images between those including input patches 510 and 512. For example, the proximate object being detected by input patches 510 and 512 can move along the surface of the touch screen 500, such as by a user moving their finger along the surface of touch screen 500. The electronic device is able to detect the image of touch across several frames, determine that input patches 510 and 512 correspond to the same object and track the movement of the object based on the corresponding input patches 510 and 512. Although the location, shape, and size of input patches 510 and 512 is not necessarily the same, the electronic device is able to track the movement of the proximate object by determining that the input patches 510 and 512 have continuity (e.g., several frames of input patches indicative of movement of a continuous contact can be detected). Thus, characteristics of the input patches 510 and 512, such as z-density, which will be described below, can be tracked over time and associated with one proximate object.

For example, input patches from a corresponding object captured across multiple touch images can be assigned to a corresponding path. Assigning input patches to paths can allow for tracking gesture inputs (e.g., swipe, pinch, etc.). In some examples, the path can track the input contact from an initial touchdown on the touch screen through a liftoff from the touch screen. In some examples, the input patches of a path can be analyzed to identify movement of the input patch across one or more touch images and thereby track movement of an object corresponding to the input patches. Although a path can be used to identify movement, some paths may not include movement (e.g., when the input patch remains in the same position from touchdown to liftoff, such as in a tap). The tracking can include tracking position, velocities, and/or geometries (e.g., shape, number of touch nodes) of the input patches from various touch images corresponding to a path.

Various characteristics can be computed for each input patch (e.g., input patches 510 and 512, and any input patches in between) that can be used for further processing. For example, each input patch (e.g., input patches 510 and 512, and any input patches in between for a given path) can be represented by an ellipse defined by a centroid, major and minor axis lengths and a major axis (and/or minor axis) orientation (or alternatively an x-axis radius and a y-axis radius). In some examples, a maximum signal and/or a minimum signal can be measured for each input patch. Additionally, the total signal, the number of touch nodes, and signal density for each input patch (e.g., input patches 510 and 512, and any input patches in between) can be computed. As described herein, in some examples, a slope across time of the signal density can be derived from the signal densities of input patches associated with the path. For example, an input patch's total signal can be calculated by summing the square of the signal value at each touch node in the input patch (e.g., input patches 510 and 512, and any input patches in between). Thus, total signal for an input patch (e.g., input patches 510 and 512, and any input patches in between) can be expressed mathematically as in Equation (1):

$$Z_P = \sum_{i,j \text{ in } P} [V^2_{[i][j]}] \quad (1)$$

where $Z_P$ can represent the total signal for an input patch (e.g., input patches 510 and 512, and any input patches in between), V can represent the signal value at a touch node and i, j can represent the row and column coordinate of each touch node. In some examples, the signal value at each touch node can be calibrated before computing the total signal.

An input patch's signal density can be computed based on the input patch's total signal. In some examples, an input patch's signal density can be calculated by dividing the total signal for an input patch (e.g., input patches 510 and 512, and any input patches in between) by the geometric mean radius of the input patch. In other examples, the input patch's signal density can be calculated by dividing the total signal for an input patch (e.g., input patches 510 and 512, and any input patches in between) by the number of touch nodes in the input patch. Thus, signal density for an input patch (e.g., input patches 510 and 512, and any input patches in between) can be expressed mathematically, for example, as in Equations (2) or (3):

$$Z_{density,p} = \frac{Z_p}{\text{geometric mean radius of } P} \quad (2)$$

$$Z_{density,p} = \frac{Z_p}{\text{number of touch nodes forming } P} \quad (3)$$

Figure 6A:
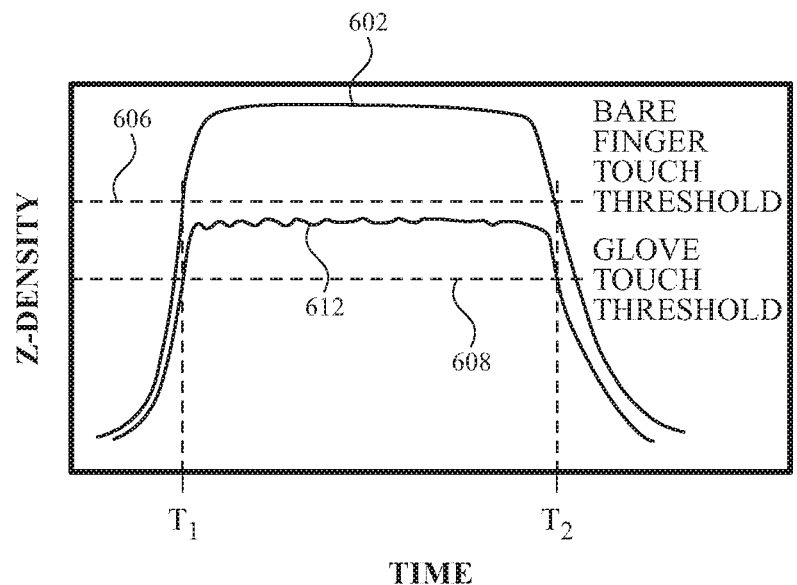
FIG. 6A illustrates an exemplary signal density diagram for an object touching and lifting off a touch sensor panel according to examples of the disclosure.

In some examples, an input patch's signal density, Zdensity, can be used to discriminate between an object hovering over the surface of a touch sensor panel and an object touching the surface of a touch sensor panel. FIG. 6A illustrates an exemplary signal density diagram for an object touching and lifting off a touch sensor panel according to examples of the disclosure. In the example of FIG. 6A, bare finger touch threshold 606 can be defined as the signal density at which point the touch sensing system can identify an input patch representative of an object directly touching the touch sensor panel when detecting touch in a bare finger touch detection mode, as will be described below. In other words, the bare finger touch threshold 606 can be the signal density at which the system determines that an object is touching the touch sensor panel when detecting touch in a bare finger touch detection mode, as will be described below. In some examples, when the signal density changes from being above the bare finger touch threshold 606 to being below the touch threshold, the touch sensing system can determine that the object has lifted off of the touch screen. In some examples, the liftoff threshold can be a different threshold than the touch threshold.

Representative curve 602 illustrates a signal density of an input patch as a function of time (e.g., the signal density measurements for a path) that can correspond to an object, such as a finger or stylus in the following sequence: approaching, touching and lifting off the touch sensor panel. At time t1, Zdensity of the input patch can reach the bare finger touch threshold 606 and the input patch can be identified as touching the touch sensor panel. At time t2, Zdensity of the input patch can decrease and cross the bare finger touch threshold again and the electronic device can determine that the object has lifted off of the touch screen.

In some examples, an object touching the surface of the touch sensor panel (e.g., Zdensity of the input patch reaches or exceeds the touch threshold) can be used to interact with a graphical user interface, whereas objects that do not produce an input patch with a Zdensity exceeding the touch threshold can be ignored. Setting inappropriate touch threshold values can cause errors. For example, setting the touch threshold too low can cause the touch sensor circuitry to be oversensitive and mistakenly identify hovering objects as touch events (i.e. false positives).

In some cases, a non-conductive barrier between an object and a touch sensor panel can cause the Zdensity of intended touches to fail to reach the bare finger touch threshold. For example, a user can be wearing one or more gloves or have a bandage one or more fingers. Touches through such a barrier (generally, "gloved touches") can be more distant from touch nodes of the touch screen and thus can have a lower total signal and signal density. As a result, although intended as touches by the user, some gloved touches can fail to reach the touch threshold and can be ignored by the touch sensor circuitry.

Referring back to FIG. 6A, representative curve 612 illustrates the signal density of an input patch that can correspond to a gloved object, such as a gloved finger in the following sequence: approaching, touching and lifting off the touch sensor panel. In the example of FIG. 6A, Zdensity of a gloved touch patch can fail to reach bare finger touch threshold 606. Thus, during a gloved touch detection mode, glove touch detection threshold 608, which is less than bare finger touch detection threshold, can be used to detect such gloved touches. In some situations, lowering the touch threshold can cause the system to be oversensitive to non-touches made by a proximate finger without a barrier ("ungloved touches" or "bare finger touches"). For example, lowering the touch threshold inappropriately can cause the system to falsely identify a hovering ungloved/bare finger as a touch, which can, in turn, can cause the electronic device to perform actions unintended by the user (e.g., activating a user interface element, etc.).

Therefore, in some examples, it is advantageous to dynamically change the touch threshold depending on whether the user is interacting with the electronic device while wearing gloves (or having some other barrier, such as a bandages) or interacting with the electronic device with bare fingers. In some examples, the electronic device can operate in one of a "bare finger mode" (e.g., the default mode) and a "glove mode" in which the touch threshold is at a higher value and an appropriate lower value, respectively. For example, the electronic device can compare the Zdensity of input patches to the bare finger touch detection threshold 606 while operating in the bare finger mode and can compare the Zdensity of input patches to the glove touch detection threshold 608 while operating in the glove mode.

The electronic device optionally switches between modes by detecting one or more characteristics of one or more input patch that are indicative of "bare finger" operation or "gloved" operation. For example, a "bare finger" touch can be detected when the Zdensity of an input patch exceeds a "bare finger" touch threshold (e.g., the bare finger touch threshold 606 illustrated in FIG. 6A, which can be the touch threshold when the touch screen is operating in the bare finger mode). A "gloved" touch can be detected, for example, based on the stability of an input patch that has a Zdensity that does not exceed the "bare finger" touch threshold.

As shown in FIG. 6A, representative curve 612 does not reach the bare finger touch threshold 606, but does reach the glove touch detection threshold 608. Moreover, representative curve 612 has a relatively stable shape between T1 and T2, unlike a period of time before T1 during which the Zdensity is increasing rapidly (e.g., gloved finger touch down) and a period of time after T2 during which Zdensity is decreasing rapidly (e.g., gloved finger lift off). Likewise, representative curve 606 has a relatively stable section between T1 and T2.

Figure 6B:
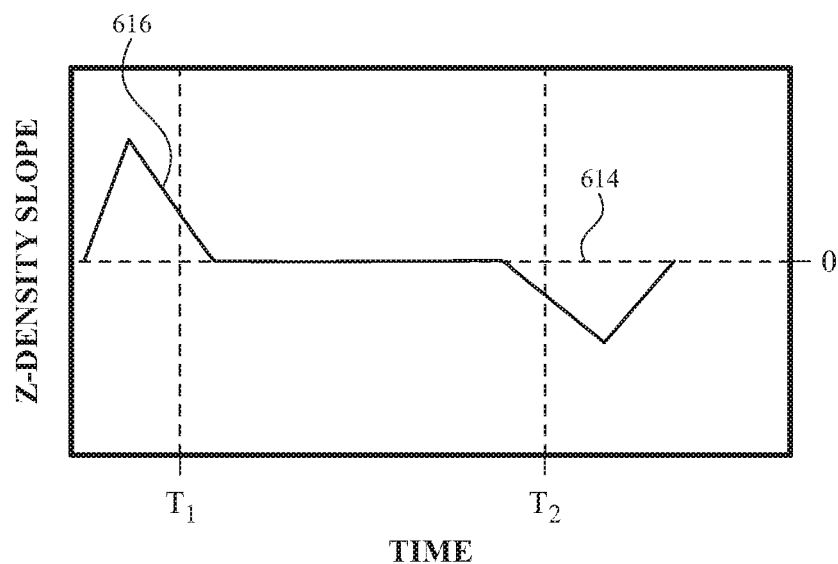
FIG. 6B illustrates the Zdensity slope of a representative curve of an object touching down on and lifting off from a touch screen according to some examples of the disclosure.

As mentioned above, in some examples, the signal density measurements for input patches associated with a path can be used to derive a slope of the signal density for the path. FIG. 6B illustrates the Zdensity slope of a representative curve of an object touching down on and lifting off from a touch screen according to some examples of the disclosure. The Zdensity slope 616 illustrated in FIG. 6B can be the slope of curve 602 illustrated in FIG. 6A. In other words, Zdensity slope 616 illustrates the time-based derivative or the rate of change of Zdensity 602 over time. As shown in FIG. 6B, prior to T1, the Zdensity slope 616 is greater than 0 (positive sign) corresponding to the increase in Zdensity over time before T1 as shown in FIG. 6A. After time T2, the Zdensity slope 616 illustrated in FIG. 6B is less than zero (negative) corresponding to the decrease in Zdensity over time after T2 as shown in FIG. 6A. Between times T1 and T2, the Zdensity slope 616 is approximately 0 (e.g., within a predetermined threshold value of zero) corresponding to the stability of Zdensity 602 as shown in FIG. 6A, between times T1 and T2.

In some examples, the electronic device is able to detect a gloved touch by detecting an input patch with a Zdensity that is less than a bare finger touch threshold and that has a relatively stable value (e.g., the Zdensity slope is approximately 0) for a predetermined amount of time. In other words, the electronic device can identify input patches as corresponding to a gloved finger when the Zdensity is relatively stable for a period of time. When a user hovers a bare finger above the touch screen, it can be difficult for the user to hover the finger at a stable height. Thus, a hovering bare finger will produce different touch signals than a touching gloved finger; the gloved finger can have a Zdensity that is more stable than the Zdensity of the hovering bare finger.

Using the above Zdensity stability criterion described above to detect a gloved touches, however, may result in some false positives. For example, it can be possible for a hovering bare finger to appear to have a stable Zdensity, thus appearing to the electronic device to be a touching gloved finger. For example, when a user is using a soft keyboard (e.g., a virtual keyboard display on the display of the touch screen) to type (e.g., to enter a message, note, etc.), the user may hover one or more fingers above the touch screen between entering characters. For example, if the user's fingers hover at a stable height (which may be more likely when a user grips the device with two hands and pauses typing), the electronic device can falsely identify the hovering bare fingers as touching gloved fingers and trigger a transition into glove mode. Falsely identifying a bare hovering finger as a touching gloved finger can cause the electronic device to incorrectly lower the touch threshold (e.g., for the purpose of detecting gloved touches). As discussed above, however, incorrectly lowering the touch threshold can lead to errors, such as processing input patches produced by hovering bare fingers as though they were produced by touching gloved fingers, for example.

In some examples, rather than using the Zdensity stability criterion alone, additional criteria may be required to transition into glove mode. In some examples, the electronic device transitions from the bare finger mode to the gloved mode in response to detecting, from the touch signals, a sequence of events including detecting the approach of an object, followed by the object remaining a stable distance from the touch screen without having a Zdensity that exceeds the bare finger touch threshold, followed by detecting liftoff of the object without detecting the object re-approaching the touch screen for a predetermined time (e.g., 0 seconds, 0.5 seconds, 1 second, etc.) after liftoff is detected. In some examples, this sequence can be detected based on the values of the Zdensity signal over time (for the path). In some examples, transitions in this sequence can be detected based on the values of the Zdensity slope over time (for the respective path). In some examples, detection of the sequence can be implemented using a finite state machine (e.g., implemented in discrete logic, a programmable logic device (PLD), a field programmable gate array (FPGA) or other circuitry configured or configurable to implement the finite state machine), as described below with reference to FIG. 7. In some examples, the finite state machine can be implemented as part of touch controller 206 in FIG. 2.

Figure 7:
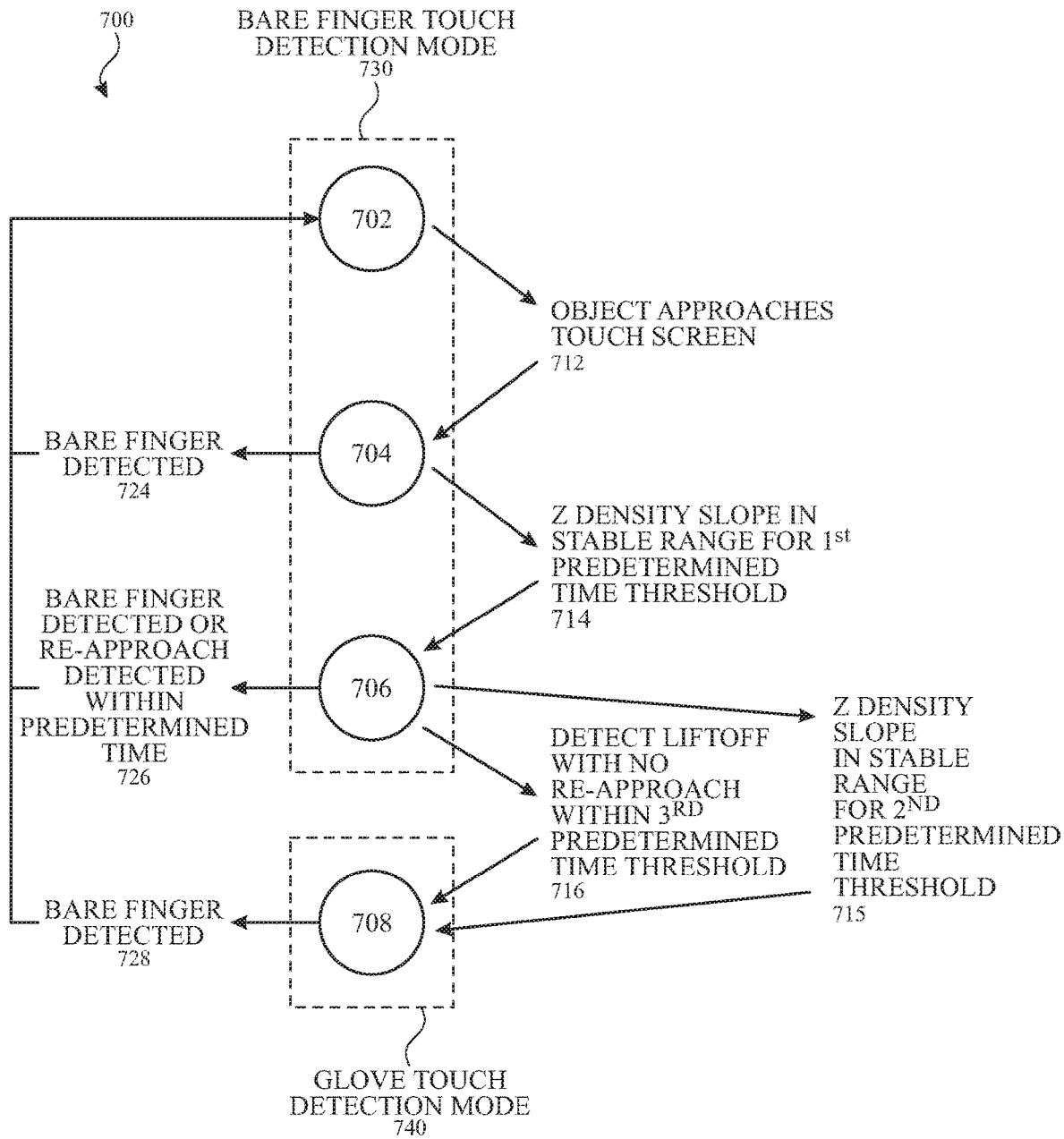
FIG. 7 illustrates an exemplary finite state machine for transitioning a touch screen between two modes of operation according to some examples of the disclosure.

FIG. 7 illustrates an exemplary finite state machine 700 for transitioning a touch screen between two modes of operation according to some examples of the disclosure. State machine 700 can be used, for example, to transition between a bare finger touch detection mode 730 and a gloved touch detection mode 740. In some examples, sensing touch in the bare finger touch detection mode includes using a bare finger touch threshold (e.g., corresponding to bare finger touch threshold 606) to identify input patches as touches and sensing touch in the gloved touch detection mode includes using a gloved touch detection threshold (e.g., corresponding to glove touch detection threshold 608) to identify input patches as touches. The bare finger touch threshold is higher than the gloved touch threshold, for example. In some examples, while sensing in either mode, the Zdensity of an input patch can be compared to the respective touch threshold to detect a touch.

State machine 700 includes a plurality of states 702, 704, 706, and 708. State 702 can correspond to a starting state of the bare finger mode 730 (e.g., default state). State 708 can correspond to the gloved mode of operation 740. States 704 and 706 can be intermediate states (while the device may continue to operate in the bare finger mode 730) used to transition from the bare finger mode 730 to the gloved mode 740. The transition from state 702 to state 708 via states 704 and 706 can represent a sequence of events (touch down, stability, lift-off without re-approach or touch down followed by sustained stability), that can be determined using Zdensity or Zdensity slope measurements that can be measured for a gloved finger. In some examples, the electronic device senses touch in the bare finger mode 730 with the relatively higher touch threshold while operating in states 702, 704, and 706 and senses touch in the gloved mode 740 with the relatively lower touch threshold while operating in state 708. The state machine 700 provides exemplary criteria 712-728 to transition between states 702-708 and thereby transition between the two modes.

In some examples, while operating in state 702, the electronic device senses touch in the bare finger mode. For example, the electronic device compares the Zdensity of input patches to a bare finger touch threshold (e.g., corresponding to bare finger touch threshold 606) to determine whether an object is touching the touch screen. In response to detecting an object approaching the touch screen (e.g., criterion 712), the electronic device optionally transitions to state 704. In some examples, detecting the object approaching the touch screen includes comparing the slope of the Zdensity to a positive threshold value. Thus, criterion 712 can be satisfied when the Zdensity slope is greater than the threshold. When criterion 712 is not satisfied (e.g., when the Zdensity slope is less than the threshold), the electronic device can remain in state 702.

In some examples, in state 704, the electronic device optionally continues to sense touch in the bare finger mode 730. While in state 704, in response to detecting an input patch with a Zdensity that exceeds the bare finger touch threshold (e.g., criterion 724), the electronic device returns to state 702, for example. In some examples, a bare finger can be detected in response to detecting an input patch with a maximum touch signal (e.g., a single touch node with the maximum signal in the input patch) greater than a threshold or a total signal for the input patch exceeding a threshold or a signal density greater than a threshold. In some examples, while in state 704, when the electronic device detects an input patch that has a Zdensity slope within a predetermined range (e.g., within a threshold range of zero) corresponding to a stable Zdensity for a first threshold period of time (e.g., criterion 714), the electronic device optionally transitions to state 706. In some examples, the electronic device determines that the slope of the Zdensity is within the predetermined range by comparing the Zdensity to a negative threshold and a positive threshold that are offset from zero by predetermined amounts. For example, an object that hovers above the touch screen without moving will have a Zdensity slope that is approximately zero. When criterion 714 is not satisfied (e.g., when the Zdensity slope exceeds the threshold in either direction without being stable for a threshold period of time), the electronic device can return to state 702 or remain in state 704.

While operating in state 706, the electronic device optionally continues to sense touch in the bare finger mode 730. In response to detecting liftoff of the input patch without detecting the object re-approaching the touch screen within a third predetermined time threshold (e.g., criterion 716), the electronic device optionally transitions to state 708. In some examples, the electronic device detects liftoff by detecting a Zdensity slope that is below a liftoff threshold (comparing the Zdensity slope to a negative threshold value). Thus, criterion 716 can be satisfied when the Zdensity slope is less than the threshold. In some examples, the electronic device detects liftoff by detecting a Zdensity less than a liftoff threshold. In some examples, if, while operating in state 706, the electronic device continues to detect a stable Zdensity slope for a second predetermined time threshold (e.g., criterion 715), the electronic device transitions to state 708 and operates in the glove touch detection mode 740.

In some examples, in response to detecting an input patch with a Zdensity that exceeds the bare finger touch threshold or in response to detecting re-approach of the object (e.g., Zdensity above a positive threshold) within a predetermined amount of time of detecting liftoff (e.g., criteria 726), the electronic device returns to state 702. In some examples, while the Zdensity slope (or Zdensity) is stable in state 706, the electronic device can remain in state 706.

In some examples, while operating in state 708, the electronic device detects touch in the glove touch mode 730, which can include comparing the Zdensity of input patches to a glove touch threshold to detect touch. As described above, the glove touch detection threshold can be lower than the bare finger touch detection threshold because, for example, a gloved finger is not able to directly touch the touch screen (due to the intervening glove) and, therefore, may cause the touch screen to detect a lower Zdensity compared with the Zdensity of a bare finger in contact with the touch screen. The electronic device optionally continues to operate in the glove touch mode until it transitions out of state 708, such as in response to detecting a Zdensity (or a maximum signal or a total signal) that exceeds the bare finger touch threshold (e.g., criterion 728).

Figure 8A:
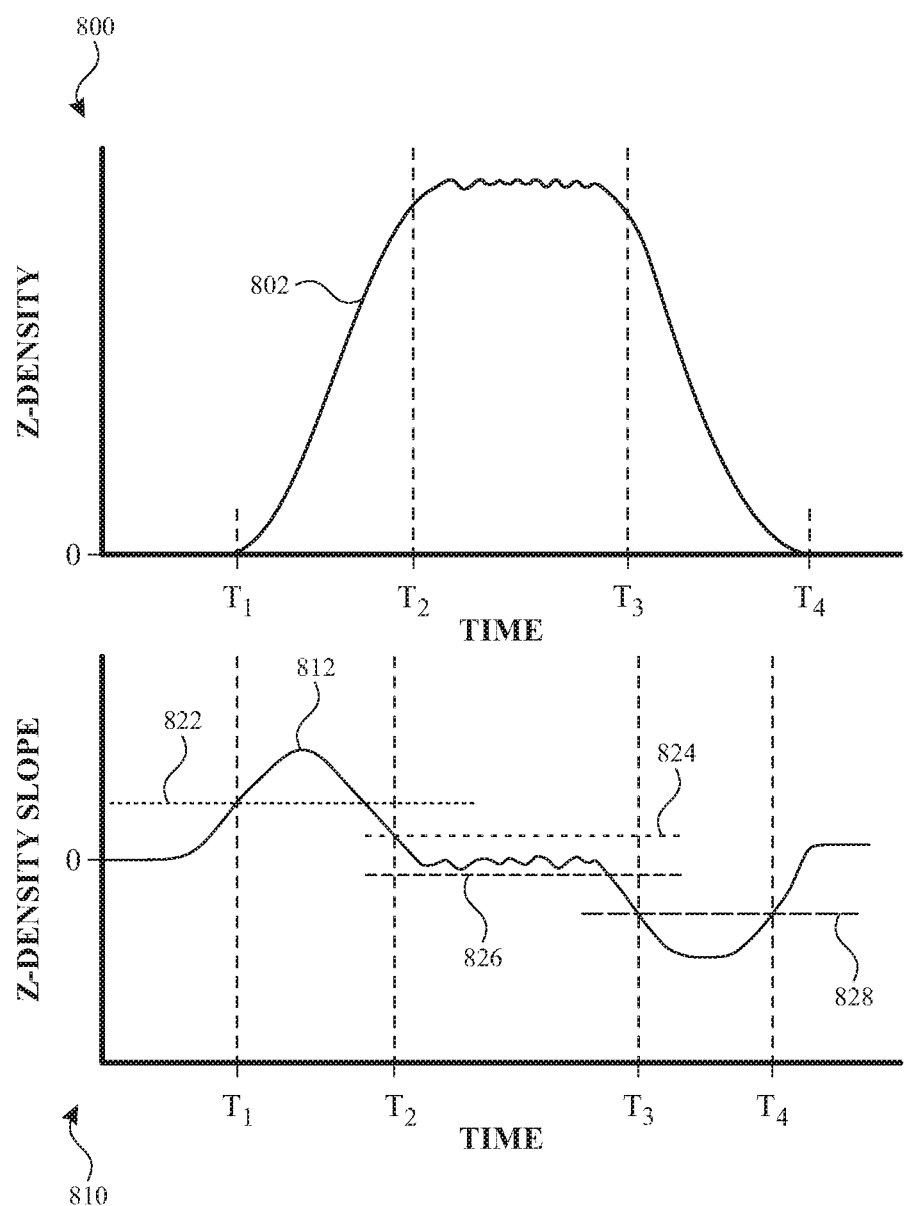
FIG. 8A illustrates exemplary Zdensity and Zdensity slope profiles associated with detecting a gloved touch according to some examples of the disclosure.

FIG. 8A illustrates exemplary Zdensity 802 and Zdensity slope 812 profiles associated with detecting a gloved touch according to some examples of the disclosure. Chart 800 illustrates an exemplary Zdensity curve 802 of a gloved finger approaching, touching, and lifting off of a touch screen, and chart 810 illustrates an exemplary Zdensity slope curve 812 corresponding to Zdensity curve 802, for example. In this example, when Zdensity 802 is increasing, Zdensity slope 812 is positive; when Zdensity 802 is stable, Zdensity slope 812 is approximately zero; and when Zdensity 802 is decreasing, Zdensity slope 812 is negative.

As shown in FIG. 8A, at time T1, Zdensity 802 is increasing and the Zdensity slope 812 exceeds a first threshold 822, for example. In some examples, the first threshold 822 is associated with detecting an object approaching the touch screen. In response to detecting the Zdensity slope 812 above the first threshold 822, the electronic device optionally transitions from state 702 to state 704 of state machine 700 illustrated in FIG. 7. Thus, detecting the Zdensity slope 812 above the first threshold 822 optionally corresponds to criterion 712.

At time T2, Zdensity 802 is substantially stable and the Zdensity slope 812 is between a second threshold 824 and a third threshold 826, for example. For example, at time T2, the gloved finger touches down on the touch screen. In some examples, the Zdensity 802 of the gloved finger at time T2 does not reach a bare finger touch threshold (not shown in FIG. 8A), such as in a manner similar to how profile 612 is less than bare finger touch threshold 606 in FIG. 6A. In response to detecting the Zdensity slope 812 between the second threshold 824 and the third threshold 826 for a threshold period of time, the electronic device optionally transitions from state 704 to state 706 of state machine 700 illustrated in FIG. 7. Thus, detecting the Zdensity slope 812 between the second threshold 824 and the third threshold 826 optionally corresponds to criterion 714.

At time T3, Zdensity 802 decreases and the Zdensity slope 812 is below a fourth threshold 828, for example. For example, at time T3, the gloved finger lifts off of the touch screen. From time T3 to time T4, the Zdensity slope 828 is below the first threshold 822, which can indicate that the object does not re-approach the touch screen between time T3 and time T4. In some examples, time T4 is a predetermined amount of time after T3, such as 0 seconds, 0.5 seconds, 1 second, or another threshold amount of time. In some examples, the threshold to which Zdensity 812 is compared to determine whether or not the object re-approaches the touch screen is different from the first threshold 822 (e.g., second threshold 824). In response to detecting the Zdensity slope 812 below the fourth threshold 828 at time T3 without detecting the object re-approaching the touch screen from T3 to T4, the electronic device optionally transitions from operating in the third state 706 to operating in the fourth state 708 of state machine 700 illustrated in FIG. 7. Thus, detecting the Zdensity slope 812 below the fourth threshold 828 at time T3 without detecting the object re-approaching the touch screen from T3 to T4 can correspond to criteria 716.

As described above with reference to FIG. 7, the electronic device can detect touch in the glove touch mode while operating in state 708. Thus, in response to detecting the sequence of a Zdensity slope 812 above the first threshold 822, then between the second threshold 824 and the third threshold 826, then below the fourth threshold 828 without exceeding a re-approach threshold (e.g., the first threshold 822 or a different threshold) for a predetermined amount of time (e.g., the time between T3 and T4), the electronic device optionally transitions from the bare finger touch detection mode to the glove touch detection mode.

If, at a time between T3 and T4, the electronic device were to detect the Zdensity slope 812 above a threshold indicative of the object re-approaching the touch screen, or, if at any time between T1 and T4, the electronic device detects a Zdensity that exceeds the bare finger touch threshold, the electronic device returns to state 702 and continues to operate in the bare finger touch detection mode.

Figure 8B:
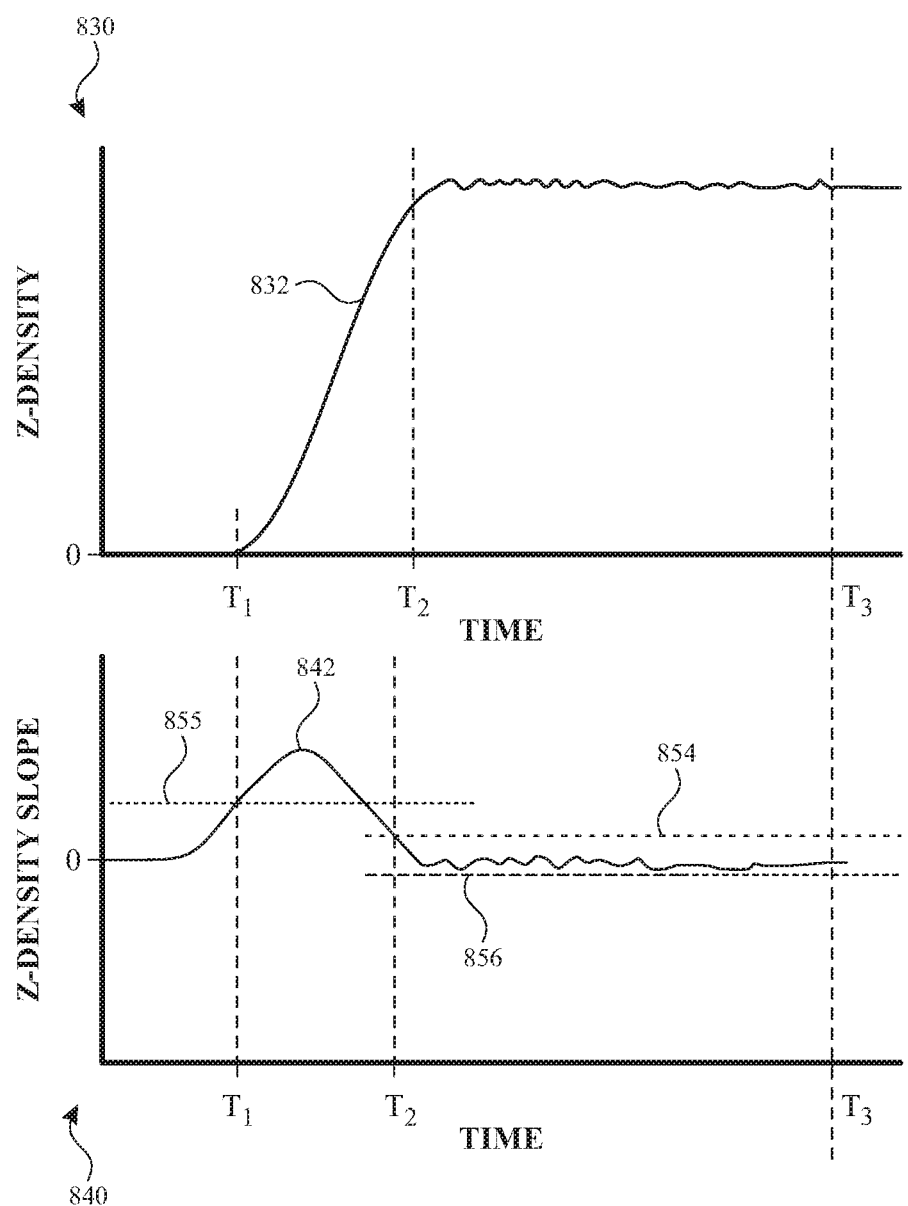
FIG. 8B illustrates exemplary Zdensity and Zdensity slope profiles associated with detecting a gloved touch according to some examples of the disclosure.

FIG. 8B illustrates exemplary Zdensity 832 and Zdensity slope 842 profiles associated with detecting a gloved touch according to some examples of the disclosure. Chart 830 illustrates an exemplary Zdensity curve 832 of a gloved finger approaching and touching a touch screen, and chart 840 illustrates an exemplary Zdensity slope curve 842 corresponding to Zdensity curve 832, for example. In this example, when Zdensity 832 is increasing, Zdensity slope 842 is positive; when Zdensity 832 is stable, Zdensity slope 842 is approximately zero; and when Zdensity 832 is decreasing, Zdensity slope 842 is negative.

As shown in FIG. 8B, at time T1, Zdensity 832 is increasing and the Zdensity slope 842 exceeds a first threshold 855, for example. In some examples, the first threshold 855 is associated with detecting an object approaching the touch screen. In response to detecting the Zdensity slope 842 above the first threshold 855, the electronic device optionally transitions from state 702 to state 704 of state machine 700 illustrated in FIG. 7. Thus, detecting the Zdensity slope 842 above the first threshold 855 optionally corresponds to criterion 712.

At time T2, Zdensity 832 is substantially stable and the Zdensity slope 842 is between a second threshold 854 and a third threshold 856, for example. For example, at time T2, the gloved finger touches down on the touch screen. In some examples, the Zdensity 832 of the gloved finger at time T2 does not reach a bare finger touch threshold (not shown in FIG. 8B), such as in a manner similar to how profile 612 is less than bare finger touch threshold 606 in FIG. 6A. In response to detecting the Zdensity slope 842 between the second threshold 854 and the third threshold 856 for a first threshold period of time (e.g., 0 seconds, 0.5 seconds, 1 second), the electronic device optionally transitions from state 704 to state 706 of state machine 700 illustrated in FIG. 7. Thus, detecting the Zdensity slope 842 between the second threshold 854 and the third threshold 856 optionally corresponds to criterion 714.

At time T3, Zdensity 832 is still substantially stable and the Zdensity slope 842 is still between the second threshold 854 and the third threshold 856. For example, the time between T2 and T3 is the second predetermined time threshold (e.g., 0 seconds, 0.5 seconds, 1 second) described above with reference to FIG. 7. In response to detecting the Zdensity slope 842 between the second threshold 854 and the third threshold 856 for the second predetermined time threshold, the electronic device can transition from state 706 illustrated in FIG. 7 to state 708 and operate in the glove touch mode 740. Thus, detecting the stable Zdensity 842 from time T2 to T3 can correspond to criterion 715.

Figure 9:
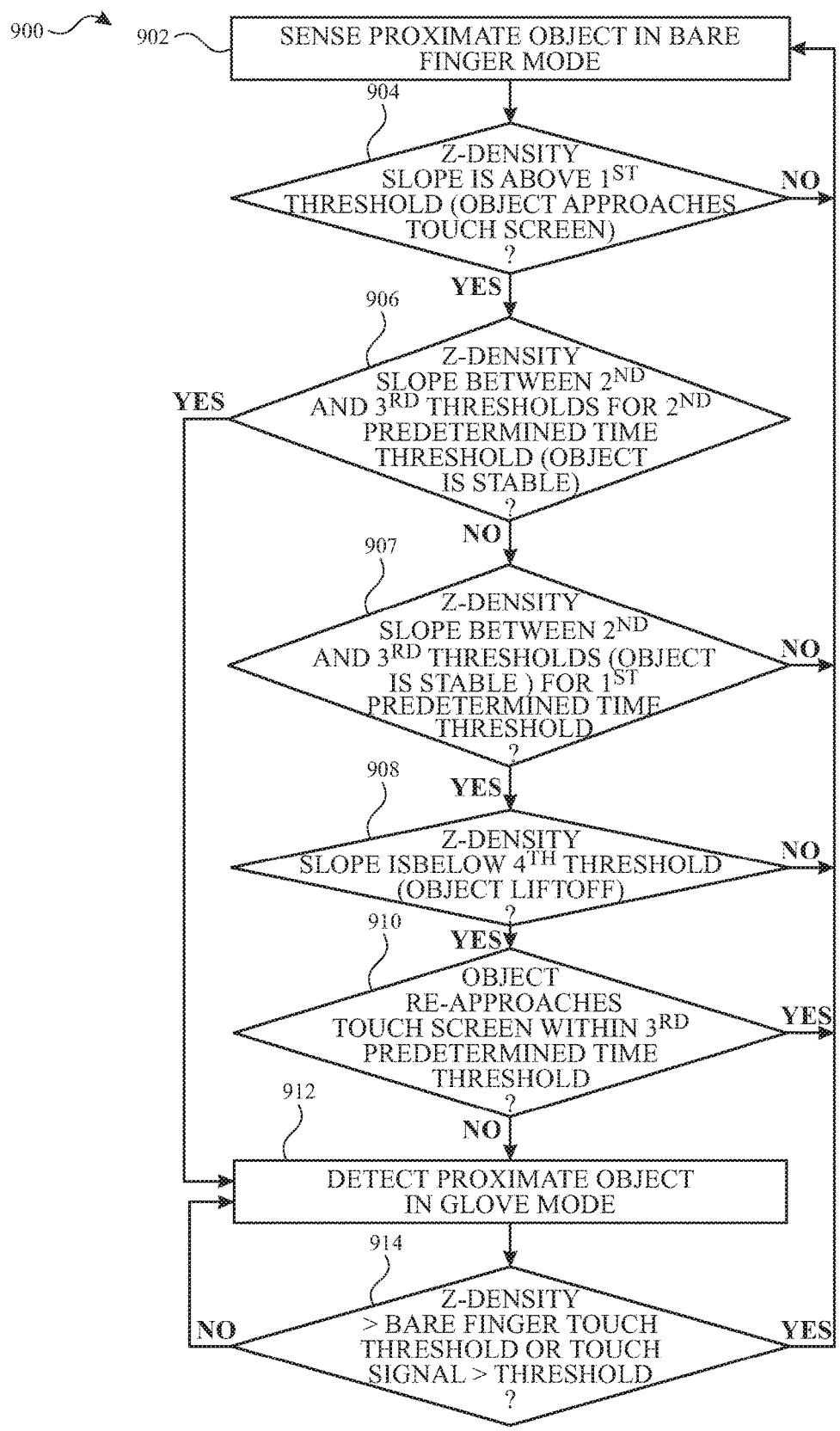
FIG. 9 illustrates an exemplary process of transitioning the electronic device between two different touch detection modes according to some examples of the disclosure.

FIG. 9 illustrates an exemplary process 900 of transitioning the electronic device between two different touch detection modes according to some examples of the disclosure. For example, process 900 can be used to transition between detecting touch in a bare finger touch mode using a bare finger touch and to detecting touch in a gloved touch detection mode using a glove touch detection threshold. Process 900 can be performed by touch processor 202, touch control 206, host processor 228 or any other processing circuits. In some example, process 900 can be performed by a finite state machine (e.g., corresponding to finite state machine 700).

At 902, the electronic device optionally operates in the bare finger touch detection mode to sense one or more proximate objects touching the touch screen. Sensing touch in bare finger mode can include comparing the Zdensity of one or more detected input patches to a bare finger touch detection threshold (e.g., bare finger touch detection threshold 606 illustrated in FIG. 6).

At 904, the electronic device can make a determination whether the detected Zdensity slope is above a first threshold (e.g., whether Zdensity slope 812 is above first threshold 822). In accordance with a determination that the Zdensity slope is less than the first threshold, the process 900 can return to 902. In accordance with a determination that the Zdensity slope is above the first threshold, the method can proceed to 906.

At 906, the electronic device can make a determination whether the subsequent detected Zdensity slope is between the second threshold and the third threshold for the second predetermined time threshold (e.g., from T2 to T3 illustrated in FIG. 8B). If the Zdensity slope is between the second and third threshold for the second predetermined time threshold, the method can proceed to 912 and the electronic device can transition to detecting touch in the glove touch mode, as described above. If the Zdensity slope is not between the second and third threshold for the second predetermined time threshold (e.g., the Zdensity slope is between the second and third threshold for a shorter duration of time, such as the first predetermined time threshold, as described below, or is not between the second and third time threshold), the method proceeds to 907.

At 907, the electronic device can make a determination whether the Zdensity slope is between the second and third threshold for the first predetermined time threshold (e.g., from T2 to T3 illustrated in FIG. 8A). In accordance with a determination that the detected Zdensity slope is not between the second threshold and the third threshold (or is not between the second and third threshold for the first predetermined time threshold), the method can return to 902. In accordance with a determination that the detected Zdensity slope is between the second threshold and the third threshold for the first threshold period of time, the method can proceed to 908.

At 908, the electronic device can make a determination whether the subsequently detected Zdensity slope is below the fourth threshold (e.g., whether the Zdensity slope 812 after T3 is below the fourth threshold 828). In accordance with a determination that the detected Zdensity slope is above a fifth threshold (not shown) that is positive, such as a threshold having a same or similar value to threshold 822 or threshold 824, the method can return to 902. In accordance with a determination that the detected Zdensity slope is below the fourth threshold, the method can proceed to 910.

At 910, the electronic device can make a determination whether a proximate object is detected approaching the touch screen within a third predetermined time threshold after detecting that the Zdensity slope is below the fourth threshold in 908. In some examples, the electronic device determines whether an object re-approaches the touch screen by comparing the Z-density slope to a predetermined threshold, such as the first threshold 822 or a different threshold (e.g., second threshold 824). In accordance with a determination that the object re-approaches the touch screen within the third predetermined time threshold, the process 900 can return to 902. In accordance with a determination that the object does not re-approach the touch screen within the third predetermined time threshold, the process 900 can proceed to 912.

At 912, the electronic device can transition from detecting proximate objects in the bare finger touch detection mode to detecting proximate objects in the glove touch detection mode. Operating in the glove touch detection mode optionally includes comparing the detected Zdensity of one or more input patches to a glove touch detection threshold that is less than the bare finger touch detection threshold (e.g., bare finger touch detection threshold 606).

After transitioning to the glove touch detection mode, the electronic device optionally determines whether, at any point in time while operating in the glove touch detection mode, the Zdensity exceeds the bare finger touch detection threshold (e.g., touch detection threshold 606) or if a touch signal that exceeds a predetermined threshold is detected at one or more touch nodes of the input patch in 914. In some examples, in accordance with a determination that the Zdensity exceeds the bare finger touch detection threshold, the process 900 can return to 902. In some examples, while operating in the glove touch detection mode, in accordance with a determination that the detected Zdensity is less than the bare finger touch detection threshold, the method can return to 912 and the electronic device can continue to operate in the glove touch detection mode. After returning to 912, the process 900 optionally proceeds again to 914 every time an input patch is detected. In other words, every input patch can be compared to the glove touch detection threshold to detect touch and can be compared to the bare finger touch detection threshold to determine whether to return to the bare finger touch detection mode. Although not shown in FIG. 9, if, at any point during process 900, the electronic device detects an input patch with a Zdensity exceeding the bare finger touch detection threshold, the process can return to 902. In other words, operations 904-910 can be executed in order without detecting an input patch with a Zdensity exceeding the bare finger touch detection threshold before transitioning from the bare finger mode to the glove mode.

As described above with reference to FIGS. 1-9, in some examples, an electronic device can detect touch in one of two touch detection modes. Each touch detection mode can have a unique touch detection threshold. For example, a bare finger touch detection mode can include comparing the detected Zdensity of one or more input patches to a bare finger touch detection threshold and a glove touch detection mode can include comparing the detected Zdensity of one or more input patches to a glove touch detection threshold that is less than the bare finger touch detection threshold.

Therefore, according to the above, some examples of the disclosure are directed to a method comprising: at an electronic device comprising a touch screen and one or more processors: sensing, in a first proximity sensing mode, signals indicative of a proximate object during multiple touch frames; calculating signal densities associated with the proximate object corresponding to the multiple touch frames; in accordance with a determination that the signal densities meet a plurality of criteria, transitioning from sensing the signal in the first proximity sensing mode to sensing the signal in the second proximity sensing mode, wherein the plurality of criteria comprise: a first criterion that is satisfied when the slope of the signal densities, calculated from the signal densities corresponding to the multiple touch frames, exceeds a first threshold at a first time; and a second criterion that is satisfied when the slope of the signal densities is less than a second threshold and greater than a third threshold for a first threshold duration of time after the first time, the second threshold less than the first threshold, and the third threshold less than the second threshold; and a third criterion that is satisfied when the slope of the signal densities is less than a fourth threshold at a second time after the threshold duration of time, the fourth threshold less than the third threshold; and in accordance with a determination that the signal densities do not meet the plurality of criteria, continuing to sense the signal in the first proximity sensing mode. Additionally or alternatively, in some examples the first criterion is indicative of the proximate object approaching the surface of the touch screen, the second criterion is indicative of the proximate object indirectly contacting the touch screen at a distance from the touch screen that deviates less than a predetermined amount from being constant, and the third criterion is indicative of the proximate object moving away from the surface of the touch screen. Additionally or alternatively, in some examples the plurality of criteria further include a fourth criterion that is satisfied in accordance with a determination that, from the second time to a third time after the third time, the signal densities are less than a fifth threshold greater than the second threshold. Additionally or alternatively, in some examples the method further includes in accordance with a determination that, at any time from the first time to the second time, a signal density of the signal densities exceeds a fifth threshold: forgoing transitioning from sensing the signal in the first proximity sensing mode to sensing the signal in the second proximity mode; and continuing to sense the signal in the first proximity sensing mode. Additionally or alternatively, in some examples the method includes while sensing the signal in the first proximity sensing mode, comparing the signal densities to a fifth threshold to determine whether or not the proximate object is touching the touch screen; and while sensing the signal in the first proximity sensing mode, comparing the signal densities to a sixth threshold to determine whether or not the proximate object is touching the touch screen, the sixth threshold less than the fifth threshold. Additionally or alternatively, in some examples the first threshold and second threshold are positive, and the third threshold and fourth threshold are negative. Additionally or alternatively, in some examples calculating the slope of the signal densities comprises: identifying a first region of the touch screen corresponding to the proximate object at a first respective time; calculating a signal density of the first region of the touch screen at the first respective time; identifying a second region of the touch screen corresponding to the proximate object at a second respective time; calculating a signal density of the second region of the touch screen at the second respective time; and calculating the rate of change between the signal density of the first region at the first respective time to the signal density of the second region at the second respective time, wherein calculating a respective signal density at a respective time includes: computing a sum of the one or more respective signals indicative of the proximate object, each respective signal of the one or more respective signals associated with a touch node included in a respective region of the touch screen; and dividing the sum of the one or more respective signals by the number of touch nodes included in the respective region of the touch screen. Additionally or alternatively, in some examples the third criterion is satisfied when the slope of the signal densities is less than a fourth threshold at a second time after the threshold duration of time, the fourth threshold less than the third threshold or the slope of the signal densities is less than the second threshold and greater than the third threshold for a second threshold duration of time after the first time, the second threshold duration of time greater than the first threshold duration of time.

Some examples of the disclosure are directed to an electronic device, comprising a touch screen; sense circuitry operatively coupled to the touch screen; and one or more processors storing instructions that, when executed, cause the electronic device to perform a method comprising: sensing, with the sense circuitry, in a first proximity sensing mode, signals indicative of a proximate object during multiple touch frames; calculating signal densities associated with the proximate object corresponding to the multiple touch frames; in accordance with a determination that the signal densities meet a plurality of criteria, transitioning from sensing the signal in the first proximity sensing mode to sensing the signal in the second proximity sensing mode, wherein the plurality of criteria comprise: a first criterion that is satisfied when the slope of the signal densities, calculated from the signal densities corresponding to the multiple touch frames, exceeds a first threshold at a first time; a second criterion that is satisfied when the slope of the signal densities is less than a second threshold and greater than a third threshold for a threshold duration of time after the first time, the second threshold less than the first threshold, and the third threshold less than the second threshold; and a third criterion that is satisfied when the slope of the signal densities is less than a fourth threshold at a second time after the threshold duration of time, the fourth threshold less than the third threshold; and in accordance with a determination that the signal densities do not meet the plurality of criteria, continuing to sense the signal in the first proximity sensing mode. Additionally or alternatively, in some examples the first criterion is indicative of the proximate object approaching the surface of the touch screen, the second criterion is indicative of the proximate object indirectly contacting the touch screen at a distance from the touch screen that deviates less than a predetermined amount from being constant, and the third criterion is indicative of the proximate object moving away from the surface of the touch screen. Additionally or alternatively, in some examples the plurality of criteria further include a fourth criterion that is satisfied in accordance with a determination that, from the second time to a third time after the third time, the signal densities are less than a fifth threshold greater than the second threshold. Additionally or alternatively, in some examples the method further comprises: in accordance with a determination that, at any time from the first time to the second time, a signal density of the signal densities exceeds a fifth threshold: forgoing transitioning from sensing the signal in the first proximity sensing mode to sensing the signal in the second proximity mode; and continuing to sense the signal in the first proximity sensing mode. Additionally or alternatively, in some examples the method further comprises: while sensing the signal in the first proximity sensing mode, comparing the signal densities to a fifth threshold to determine whether or not the proximate object is touching the touch screen; and while sensing the signal in the first proximity sensing mode, comparing the signal densities to a sixth threshold to determine whether or not the proximate object is touching the touch screen, the sixth threshold less than the fifth threshold. Additionally or alternatively, in some examples the first threshold and second threshold are positive, and the third threshold and fourth threshold are negative. Additionally or alternatively, in some examples calculating the slope of the signal densities comprises: identifying a first region of the touch screen corresponding to the proximate object at a first respective time; calculating a signal density of the first region of the touch screen at the first respective time; identifying a second region of the touch screen corresponding to the proximate object at a second respective time; calculating a signal density of the second region of the touch screen at the second respective time; and calculating the rate of change between the signal density of the first region at the first respective time to the signal density of the second region at the second respective time, wherein calculating a respective signal density at a respective time includes: computing a sum of the one or more respective signals indicative of the proximate object, each respective signal of the one or more respective signals associated with a touch node included in a respective region of the touch screen; and dividing the sum of the one or more respective signals by the number of touch nodes included in the respective region of the touch screen. Additionally or alternatively, in some examples the third criterion is satisfied when the slope of the signal densities is less than a fourth threshold at a second time after the threshold duration of time, the fourth threshold less than the third threshold or the slope of the signal densities is less than the second threshold and greater than the third threshold for a second threshold duration of time after the first time, the second threshold duration of time greater than the first threshold duration of time.

Some examples are directed to a non-transitory computer-readable medium comprising instructions that, when executed by one or more processors of an electronic device comprising a touch screen, cause the electronic device to: sensing, in a first proximity sensing mode, signals indicative of a proximate object during multiple touch frames; calculating signal densities associated with the proximate object corresponding to the multiple touch frames; in accordance with a determination that the signal densities meet a plurality of criteria, transitioning from sensing the signal in the first proximity sensing mode to sensing the signal in the second proximity sensing mode, wherein the plurality of criteria comprise: a first criterion that is satisfied when the slope of the signal densities, calculated from the signal densities corresponding to the multiple touch frames, exceeds a first threshold at a first time; a second criterion that is satisfied when the slope of the signal densities is less than a second threshold and greater than a third threshold for a threshold duration of time after the first time, the second threshold less than the first threshold, and the third threshold less than the second threshold; and a third criterion that is satisfied when the slope of the signal densities is less than a fourth threshold at a second time after the threshold duration of time, the fourth threshold less than the third threshold; and in accordance with a determination that the signal densities do not meet the plurality of criteria, continuing to sense the signal in the first proximity sensing mode. Additionally or alternatively, in some examples the first criterion is indicative of the proximate object approaching the surface of the touch screen, the second criterion is indicative of the proximate object indirectly contacting the touch screen at a distance from the touch screen that deviates less than a predetermined amount from being constant, and the third criterion is indicative of the proximate object moving away from the surface of the touch screen. Additionally or alternatively, in some examples in the plurality of criteria further include a fourth criterion that is satisfied in accordance with a determination that, from the second time to a third time after the third time, the signal densities are less than a fifth threshold greater than the second threshold. Additionally or alternatively, in some examples the instructions further cause the electronic device to: in accordance with a determination that, at any time from the first time to the second time, a signal density of the signal densities exceeds a fifth threshold: forgo transitioning from sensing the signal in the first proximity sensing mode to sensing the signal in the second proximity mode; and continue to sense the signal in the first proximity sensing mode. Additionally or alternatively, in some examples the instructions further cause the electronic device to: while sensing the signal in the first proximity sensing mode, compare the signal densities to a fifth threshold to determine whether or not the proximate object is touching the touch screen; and while sensing the signal in the first proximity sensing mode, compare the signal densities to a sixth threshold to determine whether or not the proximate object is touching the touch screen, the sixth threshold less than the fifth threshold. Additionally or alternatively, in some examples the first threshold and second threshold are positive, and the third threshold and fourth threshold are negative. Additionally or alternatively, in some examples calculating the slope of the signal densities comprises: identifying a first region of the touch screen corresponding to the proximate object at a first respective time; calculating a signal density of the first region of the touch screen at the first respective time; identifying a second region of the touch screen corresponding to the proximate object at a second respective time; calculating a signal density of the second region of the touch screen at the second respective time; and calculating the rate of change between the signal density of the first region at the first respective time to the signal density of the second region at the second respective time, wherein calculating a respective signal density at a respective time includes: computing a sum of the one or more respective signals indicative of the proximate object, each respective signal of the one or more respective signals associated with a touch node included in a respective region of the touch screen; and dividing the sum of the one or more respective signals by the number of touch nodes included in the respective region of the touch screen. Additionally or alternatively, in some examples the third criterion is satisfied when the slope of the signal densities is less than a fourth threshold at a second time after the threshold duration of time, the fourth threshold less than the third threshold or the slope of the signal densities is less than the second threshold and greater than the third threshold for a second threshold duration of time after the first time, the second threshold duration of time greater than the first threshold duration of time.

Some examples of the disclosure are directed to a method comprising: at an electronic device comprising a touch screen and one or more processors: sensing, in a first proximity sensing mode, signals indicative of a proximate object during multiple touch frames; calculating signal densities associated with the proximate object corresponding to the multiple touch frames; in accordance with a determination that the signal densities meet a plurality of criteria, transitioning from sensing the signal in the first proximity sensing mode to sensing the signal in the second proximity sensing mode, wherein the plurality of criteria comprise: a first criterion that is satisfied when the slope of the signal densities, calculated from the signal densities corresponding to the multiple touch frames, is indicative of the proximate object approaching the surface of the touch screen; and a second criterion that is satisfied when the slope of the signal densities is indicative of the proximate object indirectly contacting the touch screen at a distance from the touch screen that deviates less than a predetermined amount from being constant; and a third criterion that is satisfied when the slope of the signal densities is indicative of the proximate object moving away from the surface of the touch screen. Additionally or alternatively, in some examples, satisfying the first criterion includes detecting that the slope of the signal densities, calculated from the signal densities corresponding to the multiple touch frames, exceeds a first threshold at a first time, satisfying the second criterion includes detecting that the slope of the signal densities is less than a second threshold and greater than a third threshold for a first threshold duration of time after the first time, the second threshold less than the first threshold, and the third threshold less than the second threshold, and satisfying the third criterion includes detecting that the slope of the signal densities is less than a fourth threshold at a second time after the threshold duration of time, the fourth threshold less than the third threshold.

Some examples of the disclosure are directed to an electronic device, comprising: a touch screen; sense circuitry operatively coupled to the touch screen; and one or more processors storing instructions that, when executed, cause the electronic device to perform a method comprising: sensing, in a first proximity sensing mode, signals indicative of a proximate object during multiple touch frames; calculating signal densities associated with the proximate object corresponding to the multiple touch frames; in accordance with a determination that the signal densities meet a plurality of criteria, transitioning from sensing the signal in the first proximity sensing mode to sensing the signal in the second proximity sensing mode, wherein the plurality of criteria comprise: a first criterion that is satisfied when the slope of the signal densities, calculated from the signal densities corresponding to the multiple touch frames, is indicative of the proximate object approaching the surface of the touch screen; and a second criterion that is satisfied when the slope of the signal densities is indicative of the proximate object indirectly contacting the touch screen at a distance from the touch screen that deviates less than a predetermined amount from being constant; and a third criterion that is satisfied when the slope of the signal densities is indicative of the proximate object moving away from the surface of the touch screen. Additionally or alternatively, in some examples, satisfying the first criterion includes detecting that the slope of the signal densities, calculated from the signal densities corresponding to the multiple touch frames, exceeds a first threshold at a first time, satisfying the second criterion includes detecting that the slope of the signal densities is less than a second threshold and greater than a third threshold for a first threshold duration of time after the first time, the second threshold less than the first threshold, and the third threshold less than the second threshold, and satisfying the third criterion includes detecting that the slope of the signal densities is less than a fourth threshold at a second time after the threshold duration of time, the fourth threshold less than the third threshold.

Some examples of the disclosure are directed to a non-transitory computer-readable medium comprising instructions that, when executed by one or more processors of an electronic device comprising a touch screen, cause the electronic device to: sense, in a first proximity sensing mode, signals indicative of a proximate object during multiple touch frames; calculate signal densities associated with the proximate object corresponding to the multiple touch frames; in accordance with a determination that the signal densities meet a plurality of criteria, transition from sensing the signal in the first proximity sensing mode to sensing the signal in the second proximity sensing mode, wherein the plurality of criteria comprise: a first criterion that is satisfied when the slope of the signal densities, calculated from the signal densities corresponding to the multiple touch frames, is indicative of the proximate object approaching the surface of the touch screen; and a second criterion that is satisfied when the slope of the signal densities is indicative of the proximate object indirectly contacting the touch screen at a distance from the touch screen that deviates less than a predetermined amount from being constant; and a third criterion that is satisfied when the slope of the signal densities is indicative of the proximate object moving away from the surface of the touch screen. Additionally or alternatively, in some examples, satisfying the first criterion includes detecting that the slope of the signal densities, calculated from the signal densities corresponding to the multiple touch frames, exceeds a first threshold at a first time, satisfying the second criterion includes detecting that the slope of the signal densities is less than a second threshold and greater than a third threshold for a first threshold duration of time after the first time, the second threshold less than the first threshold, and the third threshold less than the second threshold, and satisfying the third criterion includes detecting that the slope of the signal densities is less than a fourth threshold at a second time after the threshold duration of time, the fourth threshold less than the third threshold.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

The invention claimed is:

1. A method comprising:
at an electronic device comprising a touch screen and one or more processors:
sensing, in a first proximity sensing mode, signals indicative of a proximate object during multiple touch frames;
calculating signal densities associated with the proximate object corresponding to the multiple touch frames;
in accordance with a determination that the signal densities meet a plurality of criteria, transitioning from sensing the signal in the first proximity sensing mode to sensing the signal in a second proximity sensing mode, wherein the plurality of criteria comprise:
a first criterion that is satisfied when the slope of the signal densities, calculated from the signal densities corresponding to the multiple touch frames, is indicative of the proximate object approaching the surface of the touch screen; and
a second criterion that is satisfied when the slope of the signal densities is indicative of the proximate object indirectly contacting the touch screen at a distance from the touch screen that deviates less than a predetermined amount from being constant; and
a third criterion that is satisfied when the slope of the signal densities is indicative of the proximate object moving away from the surface of the touch screen.

2. The method of claim 1, wherein:
satisfying the first criterion includes detecting that the slope of the signal densities, calculated from the signal densities corresponding to the multiple touch frames, exceeds a first threshold at a first time,
satisfying the second criterion includes detecting that the slope of the signal densities is less than a second threshold and greater than a third threshold for a first threshold duration of time after the first time, the second threshold less than the first threshold, and the third threshold less than the second threshold, and
satisfying the third criterion includes detecting that the slope of the signal densities is less than a fourth threshold at a second time after the threshold duration of time, the fourth threshold less than the third threshold.

3. The method of claim 2, wherein the plurality of criteria further include a fourth criterion that is satisfied in accordance with a determination that, from the second time to a third time after the third time, the signal densities are less than a fifth threshold greater than the second threshold.

4. The method of claim 2, further comprising:
in accordance with a determination that, at any time from the first time to the second time, a signal density of the signal densities exceeds a fifth threshold:
forgoing transitioning from sensing the signal in the first proximity sensing mode to sensing the signal in the second proximity sensing mode; and
continuing to sense the signal in the first proximity sensing mode.

5. The method of claim 2, further comprising:
while sensing the signal in the first proximity sensing mode, comparing the signal densities to a fifth threshold to determine whether or not the proximate object is touching the touch screen; and
while sensing the signal in the second proximity sensing mode, comparing the signal densities to a sixth threshold to determine whether or not the proximate object is touching the touch screen, the sixth threshold less than the fifth threshold.

6. The method of claim 2, wherein:
the first threshold and second threshold are positive, and the third threshold and fourth threshold are negative.

7. The method of claim 2, wherein calculating the slope of the signal densities comprises:
identifying a first region of the touch screen corresponding to the proximate object at a first respective time;
calculating a signal density of the first region of the touch screen at the first respective time;
identifying a second region of the touch screen corresponding to the proximate object at a second respective time;
calculating a signal density of the second region of the touch screen at the second respective time; and
calculating the rate of change between the signal density of the first region at the first respective time to the signal density of the second region at the second respective time,
wherein calculating a respective signal density at a respective time includes:
computing a sum of the one or more respective signals indicative of the proximate object, each respective signal of the one or more respective signals associated with a touch node included in a respective region of the touch screen; and
dividing the sum of the one or more respective signals by the number of touch nodes included in the respective region of the touch screen.

8. The method of claim 2, wherein:
the third criterion is satisfied when the slope of the signal densities is less than a fourth threshold at a second time after the threshold duration of time, the fourth threshold less than the third threshold or the slope of the signal densities is less than the second threshold and greater than the third threshold for a second threshold duration of time after the first time, the second threshold duration of time greater than the first threshold duration of time.

9. An electronic device, comprising:
a touch screen;
sense circuitry operatively coupled to the touch screen; and
one or more processors storing instructions that, when executed, cause the electronic device to perform a method comprising:
sensing, in a first proximity sensing mode, signals indicative of a proximate object during multiple touch frames;
calculating signal densities associated with the proximate object corresponding to the multiple touch frames;
in accordance with a determination that the signal densities meet a plurality of criteria, transitioning from sensing the signal in the first proximity sensing mode to sensing the signal in a second proximity sensing mode, wherein the plurality of criteria comprise:
a first criterion that is satisfied when the slope of the signal densities,
calculated from the signal densities corresponding to the multiple touch frames, is indicative of the proximate object approaching the surface of the touch screen; and
a second criterion that is satisfied when the slope of the signal densities is indicative of the proximate object indirectly contacting the touch screen at a distance from the touch screen that deviates less than a predetermined amount from being constant; and
a third criterion that is satisfied when the slope of the signal densities is indicative of the proximate object moving away from the surface of the touch screen.

10. The electronic device of claim 9, wherein:
satisfying the first criterion includes detecting that the slope of the signal densities, calculated from the signal densities corresponding to the multiple touch frames, exceeds a first threshold at a first time,
satisfying the second criterion includes detecting that the slope of the signal densities is less than a second threshold and greater than a third threshold for a first threshold duration of time after the first time, the second threshold less than the first threshold, and the third threshold less than the second threshold, and
satisfying the third criterion includes detecting that the slope of the signal densities is less than a fourth threshold at a second time after the threshold duration of time, the fourth threshold less than the third threshold.

11. The electronic device of claim 10, wherein the plurality of criteria further include a fourth criterion that is satisfied in accordance with a determination that, from the second time to a third time after the third time, the signal densities are less than a fifth threshold greater than the second threshold.

12. The electronic device of claim 10, wherein the method further comprises:
while sensing the signal in the first proximity sensing mode, comparing the signal densities to a fifth threshold to determine whether or not the proximate object is touching the touch screen; and
while sensing the signal in the second proximity sensing mode, comparing the signal densities to a sixth threshold to determine whether or not the proximate object is touching the touch screen, the sixth threshold less than the fifth threshold.

13. The electronic device of claim 10, wherein calculating the slope of the signal densities comprises:

identifying a first region of the touch screen corresponding to the proximate object at a first respective time;
calculating a signal density of the first region of the touch screen at the first respective time;
identifying a second region of the touch screen corresponding to the proximate object at a second respective time;
calculating a signal density of the second region of the touch screen at the second respective time; and
calculating the rate of change between the signal density of the first region at the first respective time to the signal density of the second region at the second respective time,
wherein calculating a respective signal density at a respective time includes:
computing a sum of the one or more respective signals indicative of the proximate object, each respective signal of the one or more respective signals associated with a touch node included in a respective region of the touch screen; and
dividing the sum of the one or more respective signals by the number of touch nodes included in the respective region of the touch screen.

14. The electronic device of claim 10, wherein:
the third criterion is satisfied when the slope of the signal densities is less than a fourth threshold at a second time after the threshold duration of time, the fourth threshold less than the third threshold or the slope of the signal densities is less than the second threshold and greater than the third threshold for a second threshold duration of time after the first time, the second threshold duration of time greater than the first threshold duration of time.

15. A non-transitory computer-readable medium comprising instructions that, when executed by one or more processors of an electronic device comprising a touch screen, cause the electronic device to:
sense, in a first proximity sensing mode, signals indicative of a proximate object during multiple touch frames;
calculate signal densities associated with the proximate object corresponding to the multiple touch frames;
in accordance with a determination that the signal densities meet a plurality of criteria, transition from sensing the signal in the first proximity sensing mode to sensing the signal in a second proximity sensing mode, wherein the plurality of criteria comprise:
a first criterion that is satisfied when the slope of the signal densities, calculated from the signal densities corresponding to the multiple touch frames, is indicative of the proximate object approaching the surface of the touch screen; and
a second criterion that is satisfied when the slope of the signal densities is indicative of the proximate object indirectly contacting the touch screen at a distance from the touch screen that deviates less than a predetermined amount from being constant; and
a third criterion that is satisfied when the slope of the signal densities is indicative of the proximate object moving away from the surface of the touch screen.

16. The non-transitory computer-readable medium of claim 15, wherein:
satisfying the first criterion includes detecting that the slope of the signal densities, calculated from the signal densities corresponding to the multiple touch frames, exceeds a first threshold at a first time;
satisfying the second criterion includes detecting that the slope of the signal densities is less than a second threshold and greater than a third threshold for a first threshold duration of time after the first time, the second threshold less than the first threshold, and the third threshold less than the second threshold, and
satisfying the third criterion includes detecting that the slope of the signal densities is less than a fourth threshold at a second time after the threshold duration of time, the fourth threshold less than the third threshold.

17. The non-transitory computer-readable medium of claim 16, wherein the plurality of criteria further include a fourth criterion that is satisfied in accordance with a determination that, from the second time to a third time after the third time, the signal densities are less than a fifth threshold greater than the second threshold.

18. The non-transitory computer-readable medium of claim 16, wherein the instructions further cause the electronic device to:
while sensing the signal in the first proximity sensing mode, compare the signal densities to a fifth threshold to determine whether or not the proximate object is touching the touch screen; and
while sensing the signal in the second proximity sensing mode, compare the signal densities to a sixth threshold to determine whether or not the proximate object is touching the touch screen, the sixth threshold less than the fifth threshold.

19. The non-transitory computer-readable medium of claim 16, wherein calculating the slope of the signal densities comprises:
identifying a first region of the touch screen corresponding to the proximate object at a first respective time;
calculating a signal density of the first region of the touch screen at the first respective time;
identifying a second region of the touch screen corresponding to the proximate object at a second respective time;
calculating a signal density of the second region of the touch screen at the second respective time; and
calculating the rate of change between the signal density of the first region at the first respective time to the signal density of the second region at the second respective time,
wherein calculating a respective signal density at a respective time includes:
computing a sum of the one or more respective signals indicative of the proximate object, each respective signal of the one or more respective signals associated with a touch node included in a respective region of the touch screen; and
dividing the sum of the one or more respective signals by the number of touch nodes included in the respective region of the touch screen.

20. The non-transitory computer-readable medium of claim 16, wherein:
the third criterion is satisfied when the slope of the signal densities is less than a fourth threshold at a second time after the threshold duration of time, the fourth threshold less than the third threshold or the slope of the signal densities is less than the second threshold and greater than the third threshold for a second threshold duration of time after the first time, the second threshold duration of time greater than the first threshold duration of time.

* * * * *